United States Patent
Bajaj et al.

(10) Patent No.: US 10,628,270 B1
(45) Date of Patent: Apr. 21, 2020

(54) POINT-IN-TIME DATABASE RESTORATION USING A REDUCED DATASET

(71) Applicant: Cohesity, Inc., San Jose, CA (US)

(72) Inventors: Rupesh Bajaj, Bangalore (IN); Sunil Moolchandani, Sunnyvale, CA (US); Sandeep Tandekar, Bangalore (IN); Vivek Velankar, Bangalore (IN)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 16/252,491

(22) Filed: Jan. 18, 2019

(51) Int. Cl.
*G06F 11/14* (2006.01)
*G06F 16/27* (2019.01)

(52) U.S. Cl.
CPC ...... *G06F 11/1469* (2013.01); *G06F 11/1451* (2013.01); *G06F 16/273* (2019.01); *G06F 2201/80* (2013.01); *G06F 2201/84* (2013.01)

(58) Field of Classification Search
CPC ........ G06F 16/11; G06F 11/14; G06F 16/113; G06F 11/1446; G06F 16/273; G06F 11/1469
USPC ................................................ 707/640, 649
See application file for complete search history.

(56) References Cited

U.S. PATENT DOCUMENTS

| | | | | |
|---|---|---|---|---|
| 7,650,356 | B2 * | 1/2010 | Raheem | G06F 11/1469 707/679 |
| 9,734,021 | B1 * | 8/2017 | Sanocki | G06F 11/1469 707/640 |
| 9,940,203 | B1 * | 4/2018 | Ghatnekar | G06F 16/13 707/649 |
| 2004/0139128 | A1 * | 7/2004 | Becker | G06F 11/1456 707/804 |
| 2006/0179085 | A1 * | 8/2006 | Kaijima | G06F 11/1464 707/804 |
| 2013/0173554 | A1 * | 7/2013 | Ubukata | G06F 11/1448 707/640 |
| 2016/0034356 | A1 * | 2/2016 | Aron | G06F 16/2246 707/649 |

\* cited by examiner

*Primary Examiner* — Shahid A Alam
(74) *Attorney, Agent, or Firm* — Van Pelt, Yi & James LLP

(57) ABSTRACT

A method and system for restoring a database are described. An identification of a restoration point of the database is received. Using a processor, metadata of a plurality of backups are analyzed to identify from the plurality of backups a reduced dataset required to restore the database to the restoration point. The reduced dataset is provided for use in restoring the database to the restoration point.

22 Claims, 13 Drawing Sheets

POINT-IN-TIME DATABASE RESTORATION USING A REDUCED DATASET

BACKGROUND OF THE INVENTION

A snapshot can be created to capture a state of a database at a particular point in time. A full backup of a database system includes a snapshot of the database and may be composed of large amounts of data (e.g., terabytes, petabytes, etc.). Performing a full backup of a database at frequent intervals requires large amounts of storage. To reduce the amount of storage required, an incremental backup of the database may be performed between full backups. An incremental backup includes a snapshot of the changes that have occurred to the system since the previous (full or incremental) backup. In addition to incremental backups, log backups may be performed for some databases. A log backup stores segments of the transaction log (hereinafter "log files") for the database. The transaction log lists operations performed on the database files and the time at which the operations were performed. Thus, a log file includes the transactions occurring since the last (log, incremental or full) backup and the times at which the transactions occurred.

Full and incremental backups can be used to restore the database to the times at which the full or incremental backup was performed. A user may desire to restore the database to a point in time between full or incremental backups. In order to perform such a point-in-time restoration of the database, the nearest full or incremental backups are typically located. From the log backups, a user manually provides all of the log files between the closest full or incremental backups. A portion of these log files and the backups are then used to restore the database to the desired point in time.

Although a point-in-time restoration can be completed, manually providing the log files is time consuming and error prone. Selection of the log files typically requires user intervention, which is undesirable. Determining the appropriate log files and backups is complicated by the possibility of one or more restores having been performed on the database. The user not only selects the log files for the appropriate time period, but also determines the appropriate chain of restorations and backups from which to select the log files. Such a process is complicated, subject to errors and may require a significant amount of time. Moreover, a large number of log files may be provided if changes were made throughout the time between backups. Accordingly, an improved method for performing a point-in-time restoration is desired.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method and system for restoring a database are described. An identification of a restoration point of the database is received. Using a processor, metadata of a plurality of backups are analyzed to identify from the plurality of backups a reduced dataset required to restore the database to the restoration point. The reduced dataset is provided for use in restoring the database to the restoration point.

Figure 1:
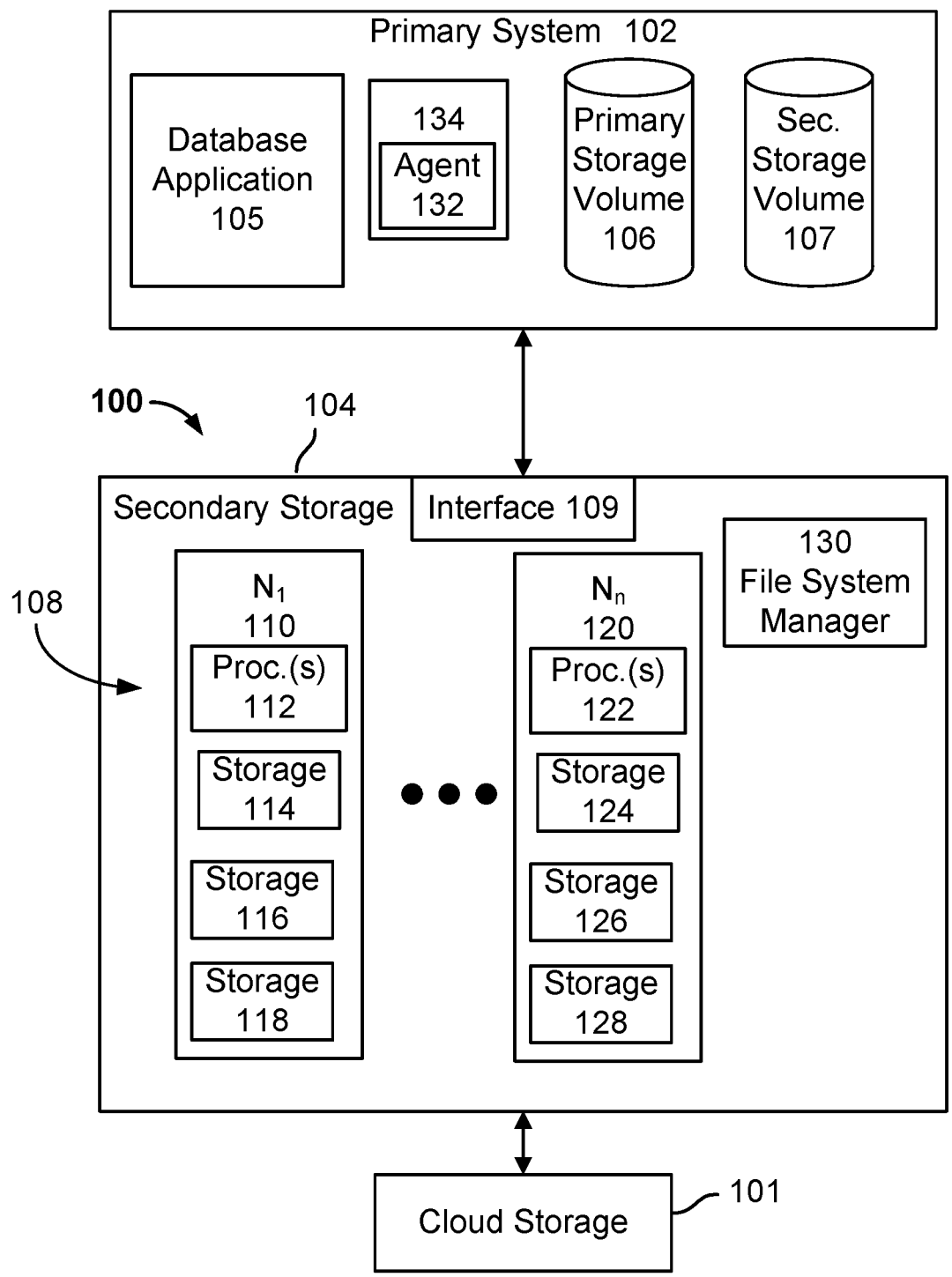
FIG. 1 is a block diagram illustrating an embodiment of a distributed storage system capable of performing a point-in-time restoration of a database.

FIG. 1 is a block diagram of system 100 for providing a distributed storage system capable of performing point-in-time restorations of a database using a reduced dataset. System 100 includes a primary system 102, secondary storage system 104 and cloud storage 101. Primary system 102 is a computing system that may be comprised of one or more servers, one or more computing devices, one or more virtual machines one or more storage devices, and/or a combination thereof. Primary system 102 includes database application 105, such as a SQL server. Thus, primary system 102 is, therefore, an exemplary embodiment of a database. For example, in one embodiment, database 102 is an Oracle database. Database application 105 may create one or more database files, such as primary database files, transaction logs and secondary database files. Database 102 may include a primary storage volume 106 and at least one secondary storage volume 107 that stores the database data associated with database application 105 and non-database data associated with database 102. In some embodiments, database 102 may include a single storage volume. Also shown as part of database 102 is backup agent 132 residing on device 134. Machine 134 may be a computing device, servers, storage system or other computing component of database 102.

Database 102 may perform a backup of primary storage volume 106 and/or the secondary storage volume(s) 107. The backup is provided to secondary storage system 104. The backup may be a snapshot of database 102 at a particular moment in time. The snapshot can be immutable. The backup may be a full backup, an incremental backup or a log backup. A full backup includes all of the data stored in the primary storage volume 106 and the secondary storage volume(s) 107. The full backup may include database data associated with database application 105. The full backup may include metadata associated with the database. The metadata associated with the database may include system change numbers (SCN) corresponding the database clock, one or more file names, log files, a creation date, offline/online status. The full backup may also include non-database data of database 102.

An incremental backup includes data in the database 102 that was not part of a previous full backup or a previous incremental backup. Stated differently, an incremental backup includes data that has changed since the previous full or incremental backup. The incremental backup may include new database files associated with database application 105, changes to existing database files associated with database application 105, or other portions of the database associated with database application 105 that were modified since a previous backup. The incremental backup may include metadata associated with the database that was not part of a previous backup. The metadata associated with the database files that were not part of a previous backup may include SCNs, log files, one or more file names, a creation date, offline/online status. The incremental backup may include non-database data that was not part of a previous backup.

In some embodiments, incremental backups may be fully hydrated. A fully hydrated backup is a backup that is very rapidly accessible (e.g., a few seconds) that does not require rehydration. A fully hydrated backup may provide a complete view of a storage volume, regardless of whether the backup is a full backup or an incremental backup. In some embodiments, the incremental backup may be merged with a previous backup to provide the fully hydrated (incremental) backup. In some embodiments, by using a file system snapshot tree, discussed below, incremental backups are stored in a fully-hydrated manner that allows the incremental backup to be directly utilized much like a full backup, directly providing a complete view and access to protected data without the need to hydrate the incremental backup or access/combine with a previous full backup. For example, for desired data not captured in an incremental backup because it was unchanged from a previous backup, the snapshot tree corresponding to the incremental backup can be created in a manner to store a link to an appropriate data portion of the previous backup that can be used to directly access the desired data. Database 102 can be more readily restored using a full backup or an incremental backup, as opposed to a log backup, described below.

A log backup stores one or more log files. A log file includes a segment of the transaction log for database 102. The transaction log is a running log of all the transactions associated with the database 102. The log file includes a sequence of one or more transactions made to a database. For each transaction, the time of the transaction is stored. For example, the start SCN and the ending SCN for the transaction may be stored. In some embodiments, log files are truncated so that the next log backup includes transactions starting from the previous backup. Thus, a log backup includes the identities of transactions occurring since the previous backup and the times at which the transactions occurred. The log files stored for log backups may be applied to the full or incremental backups of the database to restore the database to any transaction in the log file. In some embodiments, a log backup policy indicates that a log file is to be sent on a periodic basis (e.g., hourly, daily, weekly, monthly, etc.). In other embodiments, a log backup policy indicates that a log file segment is to be sent after a certain number of transactions (e.g., 50 transactions, 100 transactions, etc.). In other embodiments, a log backup policy indicates that a log file is to be sent upon a command from a user associated with database 102. In some embodiments, a log backup policy indicates that the segment of the transaction log corresponding to the log file sent to secondary storage system 104 is to be deleted after the log file is successfully stored at secondary storage system 104.

As part of providing the backups (full, incremental or log), the time range covered by the backup is stored as part of the metadata for the backup. The time range covered can include both the time range according to clock(s) (not shown) for secondary storage system 104 ("storage system time") as well as the time range according to clock(s) (not shown) for database 102 ("database time"). In some embodiments, database time corresponds to SCNs provided by database application 105. For example, the first SCN/database time and the last SCN/database time for transactions occurring since the last backup can be stored. In some embodiments, these time ranges are stored by storing the corresponding ranges for each log file that is part of the backup (i.e. that has occurred since the last backup). For example, for a full backup, the SCNs and storage system times for each log file since the last full backup can be obtained from each log file and stored in a metadata file corresponding to the full backup.

In addition, the incarnation and reset log identification of the backup may be stored as part of the backup. The incarnation and reset log relate to whether a restore has been previously performed. Thus, the incarnation and reset log delineate backups that have taken place after specific restorations. For example, the incarnation identification (incarnation ID) and reset log ID may be "I0" and "R0", respectively, for backups occurring before any restorations, "I1" and "R1" for backups occurring from the first restoration and to the second restoration, "I2" and "R2" for backups occurring from the second restoration to the third restoration, and so on.

Database 102 may be configured to backup file system data to secondary storage system 104 according to one or more backup policies. Backup agent 132 (e.g. Cohesity agent) orchestrates a backup of database 102. In some embodiments, backup agent 132 may initiate a backup according to one or more backup policies. In some embodiments, a backup policy indicates that file system data for database 102 are to be backed up to cloud 101 and/or secondary storage system 104 on a periodic basis (e.g., hourly, daily, weekly, monthly, etc.). In other embodiments, a backup policy indicates that file system data is to be backed up cloud 101 and/or secondary storage system 104 when a threshold size of data has changed. In other embodiments, a backup policy indicates that file system data is to be backed up cloud 101 and/or secondary storage system 104 upon a command from a user associated with database 102.

The backups initiated by backup agent 132 on database 102 may be performed such that the status of database 102 is stable during the backup. A backup command from backup agent 132 may cause the database application 105 to quiesce the database and to record the metadata associated with the database (e.g., SCNs, one or more file names, a creation date, offline/online status, etc.). Quiescing the database before performing a backup ensures that the database is in a consistent state prior to backup. The backup can then be performed. As discussed above, the backups performed via backup agent 132 can be full, incremental or log backups.

Secondary storage system 104 is a storage system configured to backup data received from database 102. Secondary storage system 104 may thus be coupled with the database 102 through a network and network interface 109. Secondary storage system 104 may protect a large volume of applications while supporting tight business requirements (recovery time objective (RTO) and recovery point objective (RPO)). Secondary storage system 104 may unify end-to-end protection infrastructure—including target storage, provide backup, replication of data, disaster recover, and/or cloud tiering. Secondary storage system 104 may provide scale-out, globally deduplicated, highly available storage to consolidate all secondary data, including backups, files, and test/dev copies. Secondary storage system simplifies backup infrastructure and eliminates the need to run separate backup software, proxies, media servers, and archival. Secondary storage system 104 may be fully integrated with a virtual machine (VM) centralized management tool, such as vCenter, and an API for data protection. Secondary storage system may reduce the amount of time to perform RPOs and support tightly constrained RTOs by creating a clone of a backup VM and running the VM directly from secondary storage system 104. Secondary storage system 104 may integrate natively with one or more cloud servers. This eliminates the need to use tape archives by using one or more cloud servers for long-term data archival. However, nothing prevents the use of tape archives in conjunction with secondary storage system 104 if desired.

Secondary storage system 104 may be configured to implement policy based archival of older snapshots on the cluster 108 to cloud storage for long-term retention. The cloud archive allows data to be indexed for fast search and retrieval back to on-premises from the cloud. The cloud archive allows recovery of data in the event the primary cluster fails. The cloud archive may allow data encryption in-flight and at-rest in the cloud. Secondary storage system 104 may be configured to archive a copy of the file system data in a remote storage for disaster recovery. Secondary storage system 104 may be configured to move certain file system data to a remote storage location, such as cloud storage 101, to handle spikes in storage demand. Secondary storage system 104 may be configured to implement a policy-based waterfall model that moves cold data to a remote storage location, such as cloud storage 101. Upon receiving a read for data that is stored at the remote storage location, secondary storage system 104 is configured to retrieve the data and store the data at the secondary storage location.

Secondary storage system 104 is configured to store the file system metadata and file data in tree data structure and to create a snapshot of the tree data structure, as discussed below. The snapshot may be associated with a view at a particular moment in time. A view depicts the connections between nodes of the tree data structure and the data stored in one or more leaf nodes at the particular moment in time. The tree data structure allows a chain of snapshot trees (e.g. a Cohesity snaptree) to be linked together. Each time a snapshot is performed, a root node of the snapshot tree may be linked to one or more intermediate nodes associated with a previous snapshot tree. Secondary storage system 104 may archive the file system data to cloud storage system 101 or to the cluster 108 of secondary storage system 104. The archive may include the file system data and a serialized snapshot tree data that is a serialized version of the tree data structure at the particular moment in time. In some embodiments, the archive includes a full snapshot archive of the file system data. In other embodiments, the archive includes an incremental snapshot archive of the file system data. In some embodiments, a backup policy may indicate that one or more previous snapshots are to be deleted after a full snapshot is performed.

Secondary storage system 104 may be configured to archive any of the data stored on secondary storage system 104 (e.g., tree data, other non-tree data) according to one or more archive policies. In some embodiments, an archive policy indicates that the data is to be archived to a cloud storage system and/or to a cluster storage system on a periodic basis (e.g., hourly, daily, weekly, monthly, etc.). In other embodiments, an archive policy indicates that data is to be archived to a cloud storage system and/or to another cluster storage system when a threshold size of data has changed. In other embodiments, an archive policy indicates that data is to be archived to a cloud storage system and/or to an additional cluster storage system upon a command from a user associated with secondary storage system 104.

Secondary storage system 104 may include a file system manager 130, which is configured to maintain file system data in the form of nodes arranged in the tree data structure. File system manager 130 may include instructions stored in memory (not explicitly shown in FIG. 1) and run by a processor (not shown in FIG. 1). In some embodiments, leaf nodes in the file system tree include key-value pairs that associate data keys with values in the form of particular items of file system data. A user requests a particular item of data by providing a data key to file system manager 130, which traverses a file system tree to find the item of data associated with that data key. File system manager 130 may be configured to perform a snapshot of a snapshot tree. File system manager 130 may be configured to perform one or more modifications to a snapshot tree.

Storage cluster 108 of secondary storage system 100 includes a plurality of storage nodes $N_1$ through $N_n$. For simplicity, only nodes $N_1$ 110 and $N_n$. 120 are labeled and shown. Secondary storage system 104 stores data across the nodes 110 through 120 of cluster 108. Each storage node 110 through 120 of secondary storage system 104 may be comprised of one or more processors 112 and 122 and accompanying storage elements 114, 116 and 118 and 124, 126 and 128, respectively. Storage elements 114, 116, 118,

124, 126 and/or 128 may be solid state drives, one or more hard disk drives, or a combination thereof. Secondary storage system 104 may also include one or more processors coupled to the storage drives and configured to archive data stored in the storage drives to cloud storage system 101, an additional cluster (not shown), and/or one or more other storage mediums (e.g. tape, removable storage).

Cloud storage system 101 may be a public cloud storage provider (e.g., Amazon Web Services, Microsoft Azure Blob Storage, Google Cloud Storage). Cloud storage system 101 is configured to receive and store an archive from secondary storage system 104. Cloud storage system 101 may store a full snapshot of file system data and associated serialized snapshot tree data. Cloud storage system 101 may store an incremental snapshot of file system data and associated serialized snapshot tree data. Cloud storage system 101 may provide to secondary storage system 104 file system data and a serialized snapshot tree data associated with a particular time.

Figure 2A:
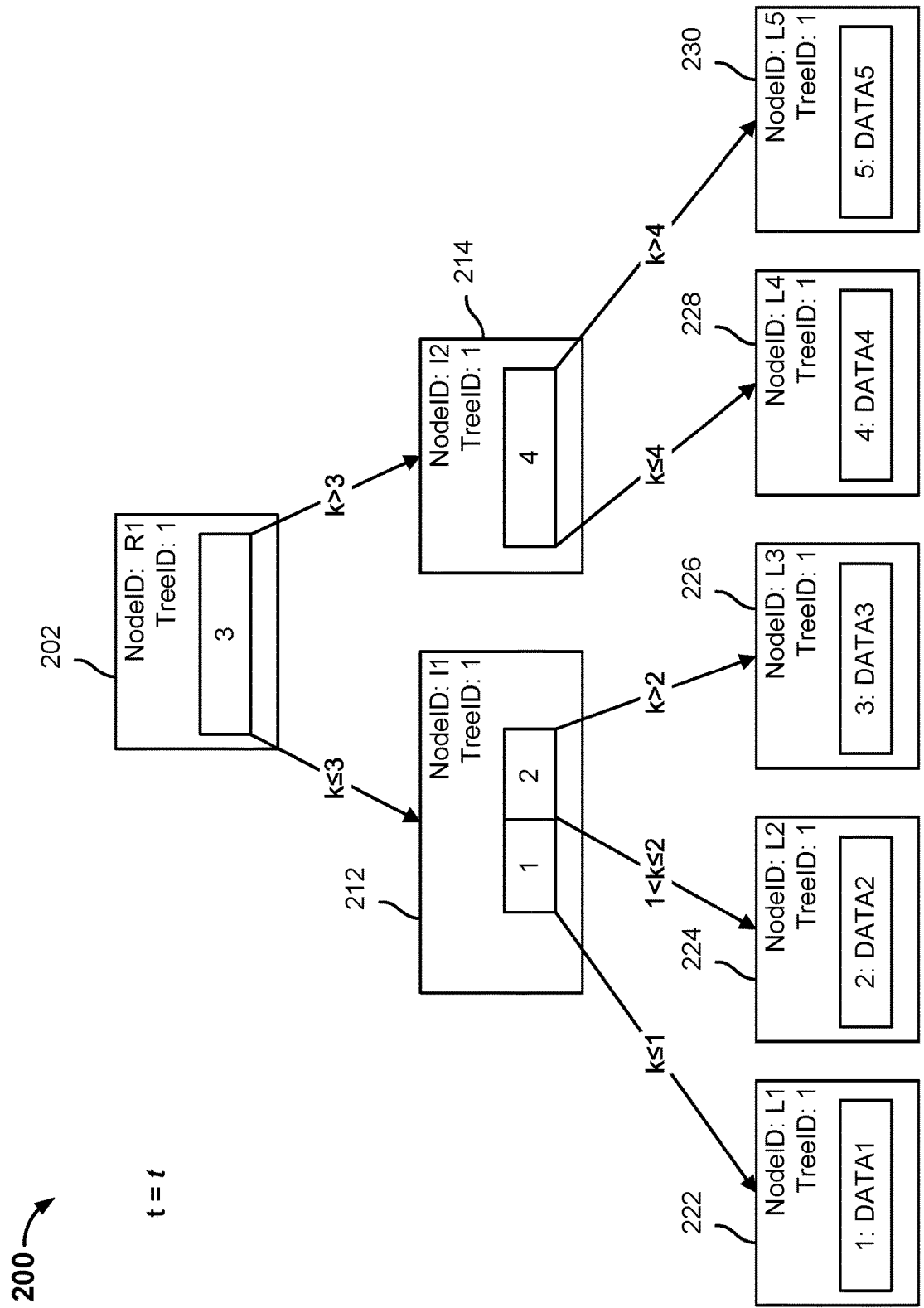
FIG. 2A is a block diagram illustrating an embodiment of a snapshot tree storing file system data.

For example FIGS. 2A-2E and 3A-3D describe snapshot trees. FIG. 2A is a block diagram illustrating an embodiment of a tree data structure storing file system data. In the example shown, tree data structure 200 may be created by a storage system, such as secondary storage system 104. In some embodiments, tree data structure 200 might be a file system metadata snapshot tree or a file snapshot tree. A file system metadata snapshot tree corresponds to a version of the storage volume(s) at a particular moment in time. A file snapshot tree may store the contents of a database or non-database file and/or metadata specific to the file. A leaf node of the file system metadata snapshot tree may include a pointer to one of the file snapshot trees, linking the contents of a file to the file system metadata snapshot tree. The plurality of files associated with the database and the database metadata represent a state of the database at a particular point in time.

In the example shown, tree data structure 200 is a snapshot tree that includes a root node 202, intermediate nodes 212, 214, and leaf nodes 222, 224, 226, 228, and 230. Although tree data structure 200 includes one intermediate level between root node 202 and leaf nodes 222, 224, 226, 228, and 230, there could be any number of intermediate levels in a snapshot tree. Tree data structure 200 may be a snapshot tree of file system data at a particular point in time t. Tree data structure 200 may correspond to a version of a snapshot tree. Root node 202 is associated with the snapshot of the file system data at the particular point in time t. In some embodiments, the file system data is metadata for a distributed file system and may include information, such as file size, directory structure, file permissions, physical storage locations of the files, etc.

A root node is the root of a snapshot tree and may include pointers to one or more other nodes. Each pointer includes a range of numerical and sorted data keys that can be found by following that particular pointer. An intermediate node is a node to which another node points (e.g., root node, other intermediate node) and includes one or more pointers to one or more other nodes. A leaf node is a node at the bottom of a snapshot tree. In some embodiments, a leaf node is a node to which another node points, but does not include a pointer to any other node. In other embodiments, a leaf node is a node to which another node points and includes a pointer to the root node of another snapshot tree. A leaf node may store key-value pairs of file system data. A data key k is a lookup value by which a particular leaf node may be accessed. For example, "1" is a data key that may be used to lookup "DATA1" of leaf node 222. Examples of values stored by a leaf node include, but are not limited to, file size, directory structure, file permissions, physical storage locations of the files, etc. A leaf node may store a data key k and a pointer to a location that stores the value associated with the data key.

A root node or an intermediate node may include one or more node keys. The node key may be an integer value or a non-integer value. Each node key indicates a division between the branches of the node and indicates how to traverse the tree data structure to find a leaf node, i.e., which pointer to follow. For example, root node 202 may include a node key of "3." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2," and "3" are less than or equal to the node key "3." To find a leaf node storing a value associated with a data key of "4" or "5," the second branch of root node 202 would be traversed to intermediate node 214 because data keys "4" and "5" are greater than the node key of "3."

A data key k of a key-value pair is not limited to a numerical value. In some embodiments, non-numerical data keys may be used for a data key-value pair (e.g., "name," "age," etc.) and a numerical number may be associated with the non-numerical data key. For example, a data key of "name" may correspond to a numerical key of "4." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function applied to a non-numerical data key, resulting in a corresponding hash. The hash can be used to select which branch of a node is associated with the non-numerical data key.

In the example shown, root node 202 includes a pointer to intermediate node 212 and a pointer to intermediate node 214. Root node 202 includes a NodeID of "R1" and a TreeID of "1." The NodeID identifies the name of the node. The TreeID identifies the snapshot/view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing snapshot tree 200 from root node 202 to intermediate node 212 because the data keys have a value that is less than or equal to the node key. Leaf nodes with a data key of "4" or "5" may be found by traversing tree data structure 200 from root node 202 to intermediate node 214 because the data keys have a value that is greater than the node key.

Root node 202 includes a first set of pointers. The first set of pointers associated with a data key less than the node key (e.g., "1," "2," or "3") indicates that traversing tree data structure 200 from root node 202 to intermediate node 212 will lead to a leaf node with a data key of "1," "2," or "3."

Intermediate node 214 includes a second set of pointers. The second set of pointers associated with a data key greater than the node key indicates that traversing tree data structure 200 from root node 202 to intermediate node 214 will lead to a leaf node with a data key of "4" or "5."

Intermediate node 212 includes a pointer to leaf node 222, a pointer to leaf node 224, and a pointer to leaf node 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes a pointer to leaf node 228 and a pointer to leaf node 230. Intermediate node 214 includes a NodeID of "I2" and a TreeID of "1." Intermediate node 214 includes a node key of "4." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "4." The pointer to leaf node 230 indicates that traversing tree data structure 200 from intermediate node 214 to leaf node 230 will lead the node with a data key of "5."

Leaf node 222 includes a data key-value pair of "1: DATA1." Leaf node 222 includes NodeID of "L1" and a TreeID of "1." To view the value associated with a data key of "1," tree data structure 200 is traversed from root node 202 to intermediate node 212 to leaf node 222.

Leaf node 224 includes a data key-value pair of "2: DATA2." Leaf node 224 includes NodeID of "L2" and a TreeID of "1." To view the value associated with a data key of "2," tree data structure 200 is traversed from root node 202 to intermediate node 212 to leaf node 224.

Leaf node 226 includes a data key-value pair of "3: DATA3." Leaf node 226 includes NodeID of "L3" and a TreeID of "1." To view the value associated with a data key of "3," tree data structure 200 is traversed from root node 202 to intermediate node 212 to leaf node 226.

Leaf node 228 includes a data key-value pair of "4: DATA4." Leaf node 228 includes NodeID of "L4" and a TreeID of "1." To view the value associated with a data key of "4," tree data structure 200 is traversed from root node 202 to intermediate node 214 to leaf node 228.

Leaf node 230 includes a data key-value pair of "5: DATA5." Leaf node 230 includes NodeID of "L5" and a TreeID of "1." To view the value associated with a data key of "5," tree data structure 200 is traversed from root node 202 to intermediate node 214 to leaf node 230.

Figure 2B:
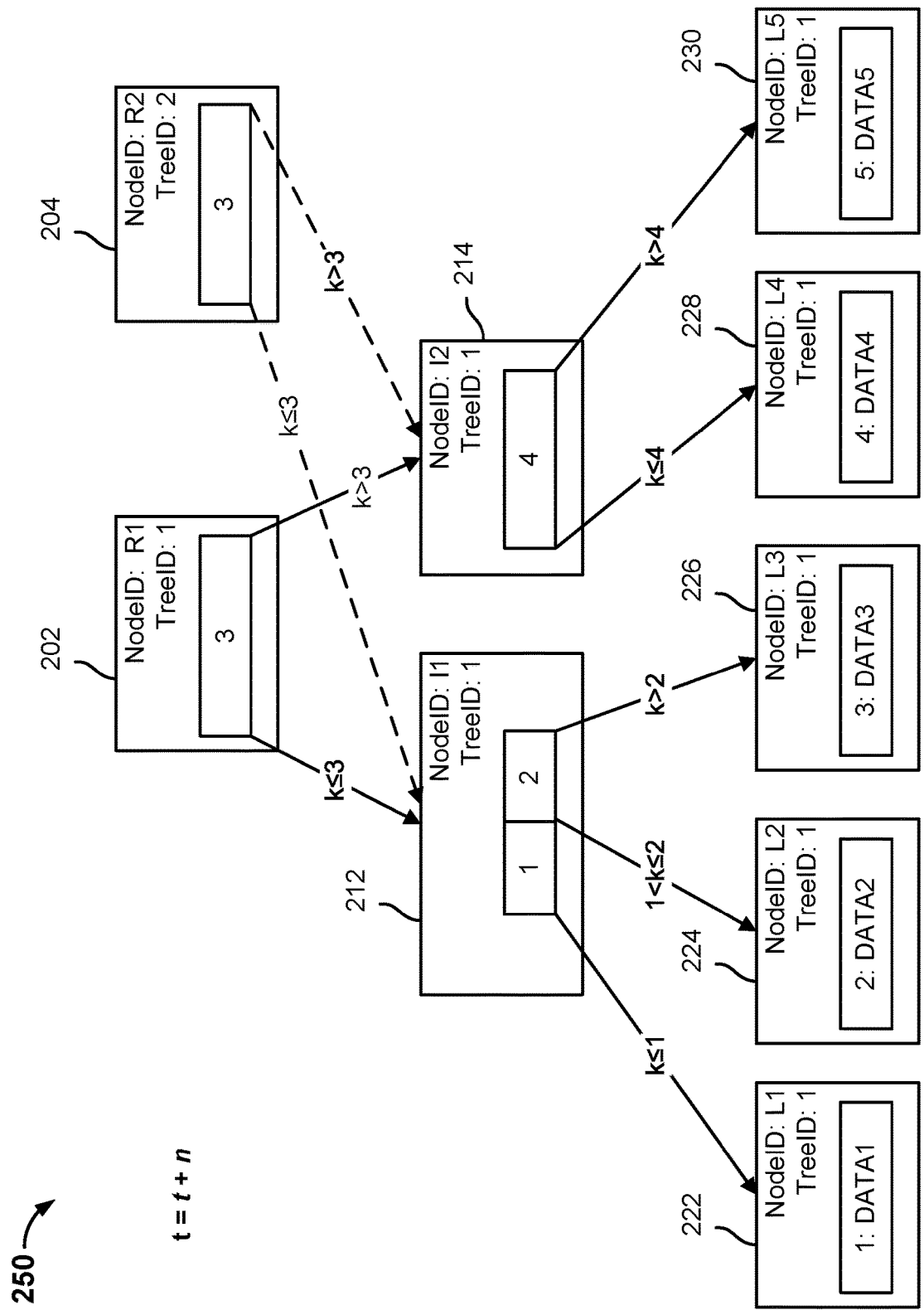
FIG. 2B is a block diagram illustrating an embodiment of cloning a snapshot tree.

FIG. 2B is a block diagram illustrating an embodiment of cloning a snapshot tree of a tree data structure. In some embodiments, tree data structure 250 may be created by a storage system, such as secondary storage system 104. In the example shown, snapshot tree 250 includes a snapshot tree that is comprised of root node 204, intermediate nodes 212, 214, and leaf nodes 222, 224, 226, 228, and 230. Tree data structure 250 may be a snapshot of file system data at a particular point in time t+n. The tree data structure allows a chain of snapshot trees to be linked together. Each time a snapshot is performed, a root node of the snapshot tree may be linked to one or more intermediate nodes associated with a previous snapshot tree. In the example shown, the snapshot tree at time t+n is linked to the snapshot tree at time t. To create a snapshot tree of the file system data at time t+n, a copy of the previous root node is created. The root node copy includes the same set of pointers as the original node. However, the root node copy also includes a different NodeID and a different TreeID than the original. The TreeID is the identifier associated with a view. Root node 204 is associated with the snapshot of the file system data at the particular point in time t+n. Root node 202 is associated with the snapshot of the file system data at the particular point in time t. The snapshot tree at time t+n may correspond to a version of a snapshot tree. In some embodiments, the snapshot tree at time t+n is a current view of the file system metadata. A current view may still accept one or more changes to the data. The TreeID of a root node indicates a snapshot with which the root node is associated. For example, root node 202 with a TreeID of "1" is associated with a first snapshot and root node 204 with a TreeID of "2" is associated with a second snapshot. In other embodiments, the snapshot tree at time t+n is a snapshot view of the file system metadata. A snapshot view may not accept any changes to the data.

In some embodiments, to create a snapshot of the file system at time t+n, two root node copies are created. Providing two new root nodes, each with a different TreeID prevents updates made to a particular view (e.g., current view) from affecting nodes of a different view (e.g., snapshot view). One of the new root nodes may be associated with a current view (i.e., modifiable) and the other new root node may be associated with a snapshot view (i.e., not modifiable). In some embodiments, a root node associated with a previous snapshot is deleted after a snapshot is performed, i.e., root node 202 is deleted after root node 204 is created.

In the example shown, root node 204 is a copy of root node 202. Similar to root node 202, root node 204 includes the same pointers as root node 202, except that root node 204 includes a different node identifier and a different view identifier. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 will lead to a leaf node with a data key of "4" or "5." Root node 204 includes a NodeID of "R2" and a TreeID of "2." The NodeID identifies the name of the node. The TreeID identifies the snapshot with which the node is associated.

Figure 2C:
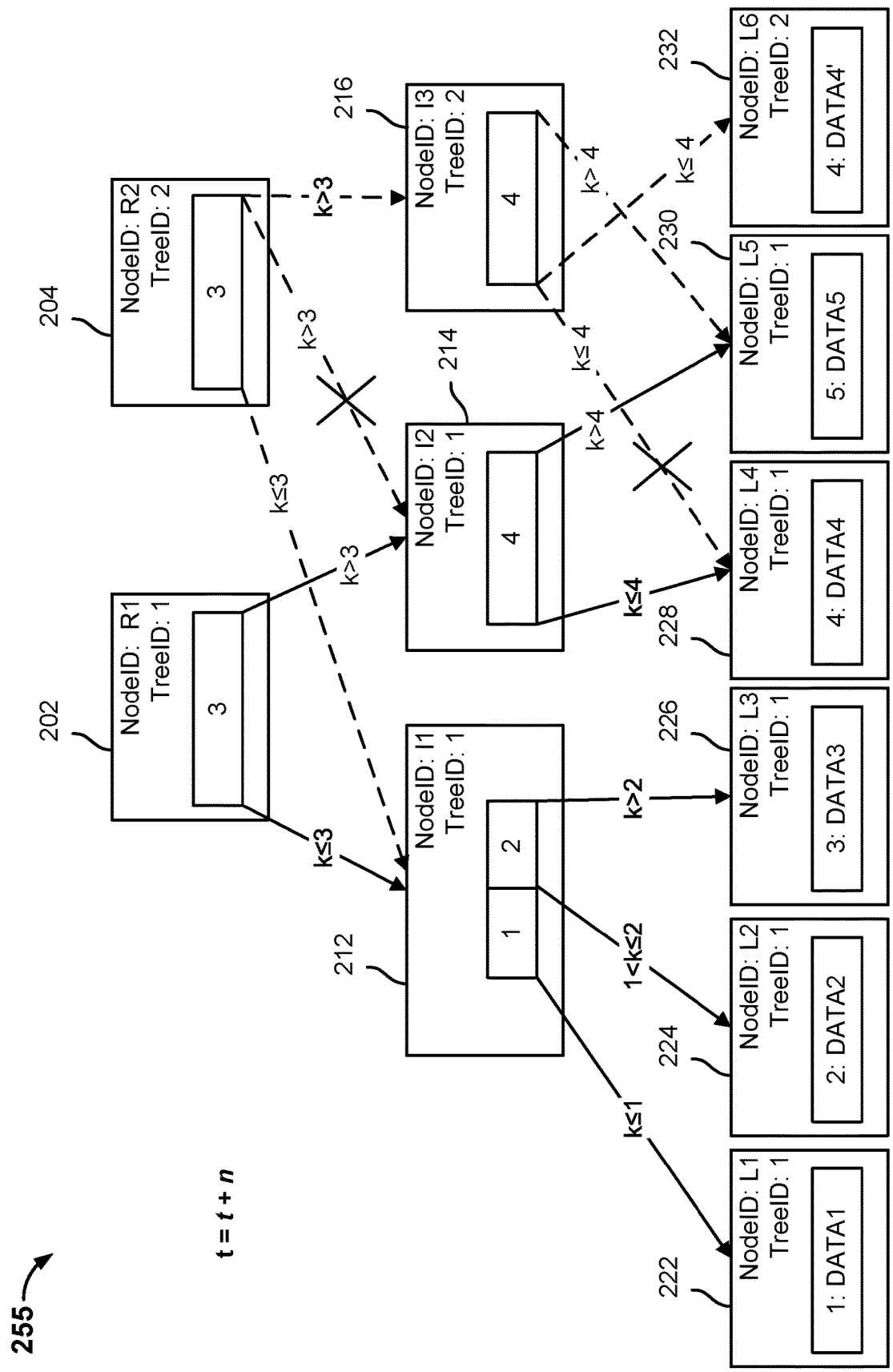
FIG. 2C is a block diagram illustrating an embodiment of modifying a snapshot tree.

FIG. 2C is a block diagram illustrating an embodiment of modifying a snapshot tree. In the example shown, tree data structure 255 may be modified by a file system manager, such as file system manager 105. Tree data structure 255 may be a current view of the file system data at time t+n. A current view may still accept one or more changes to the data. Because a snapshot represents a perspective of the file system metadata that is "frozen" in time, one or more copies of one or more nodes affected by a change to file system metadata are made. Tree data structure 255 may include a root node that corresponds to a version of a snapshot tree.

In the example shown, the value "DATA4" has been modified to be "DATA4'." At time t+n, the file system manager starts at root node 204 because that is the root node associated with snapshot tree at time t+n. The value "DATA4" is associated with the data key "4." The file system manager traverses tree data structure 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 204 and proceeds to intermediate node 214. The file system manager compares the TreeID of intermediate node 214 with the TreeID of root node 204 (the identifier associated with a snapshot at time t=t+n), determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a set of pointers of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228. Leaf node copy 232 stores the modified value "DATA4'" and includes the same TreeID as root node 204. The file system manager updates a pointer of intermediate node 216 to point to leaf node 232 instead of pointing to leaf node 228.

Figure 2D:
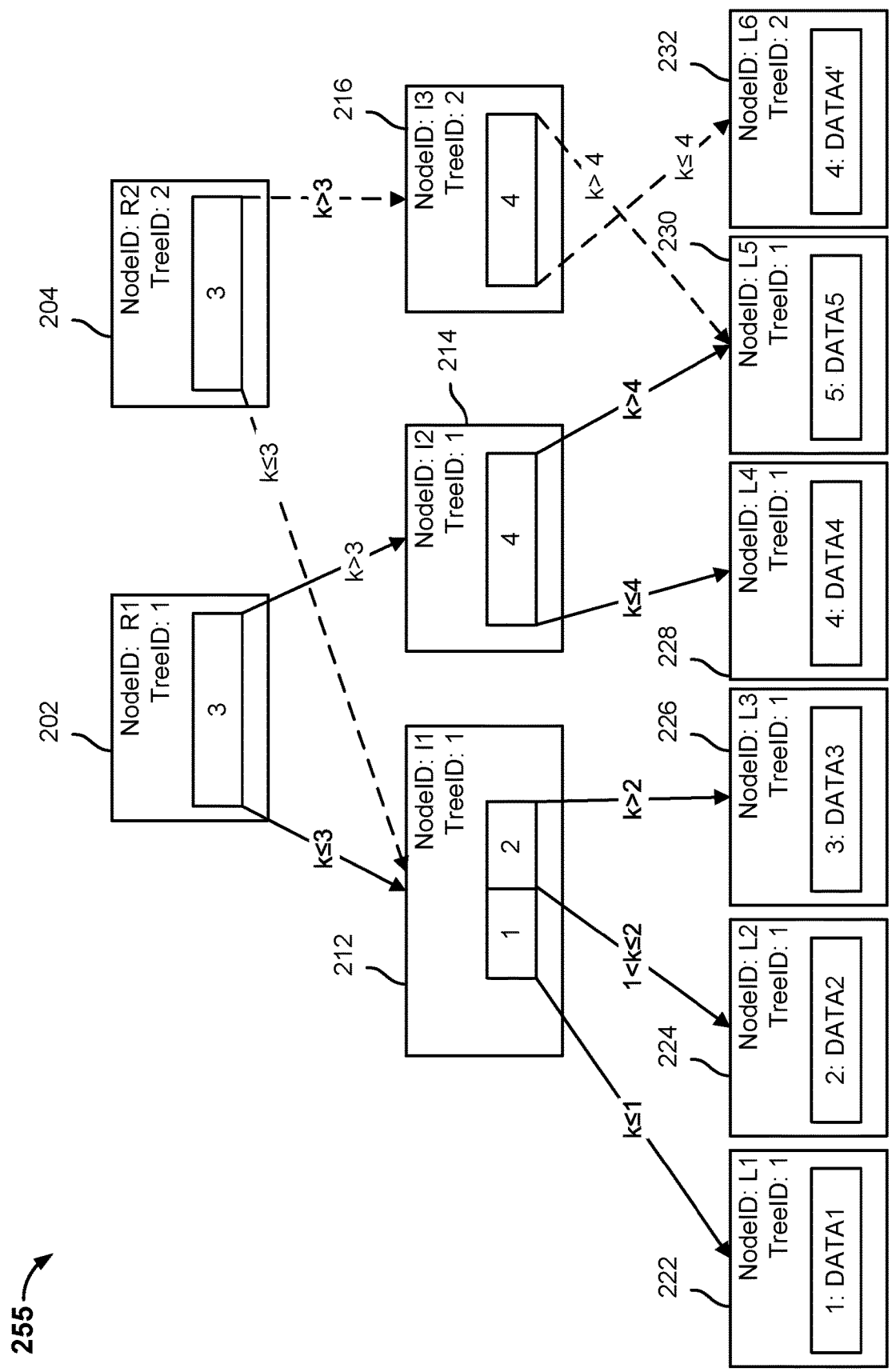
FIG. 2D is a block diagram illustrating an embodiment of a modified snapshot tree.

FIG. 2D is a block diagram illustrating an embodiment of a modified snapshot tree of a tree data structure. The tree data structure 255 shown in FIG. 2D illustrates a result of the modifications made to tree data structure 255 as described with respect to FIG. 2C.

Figure 2E:
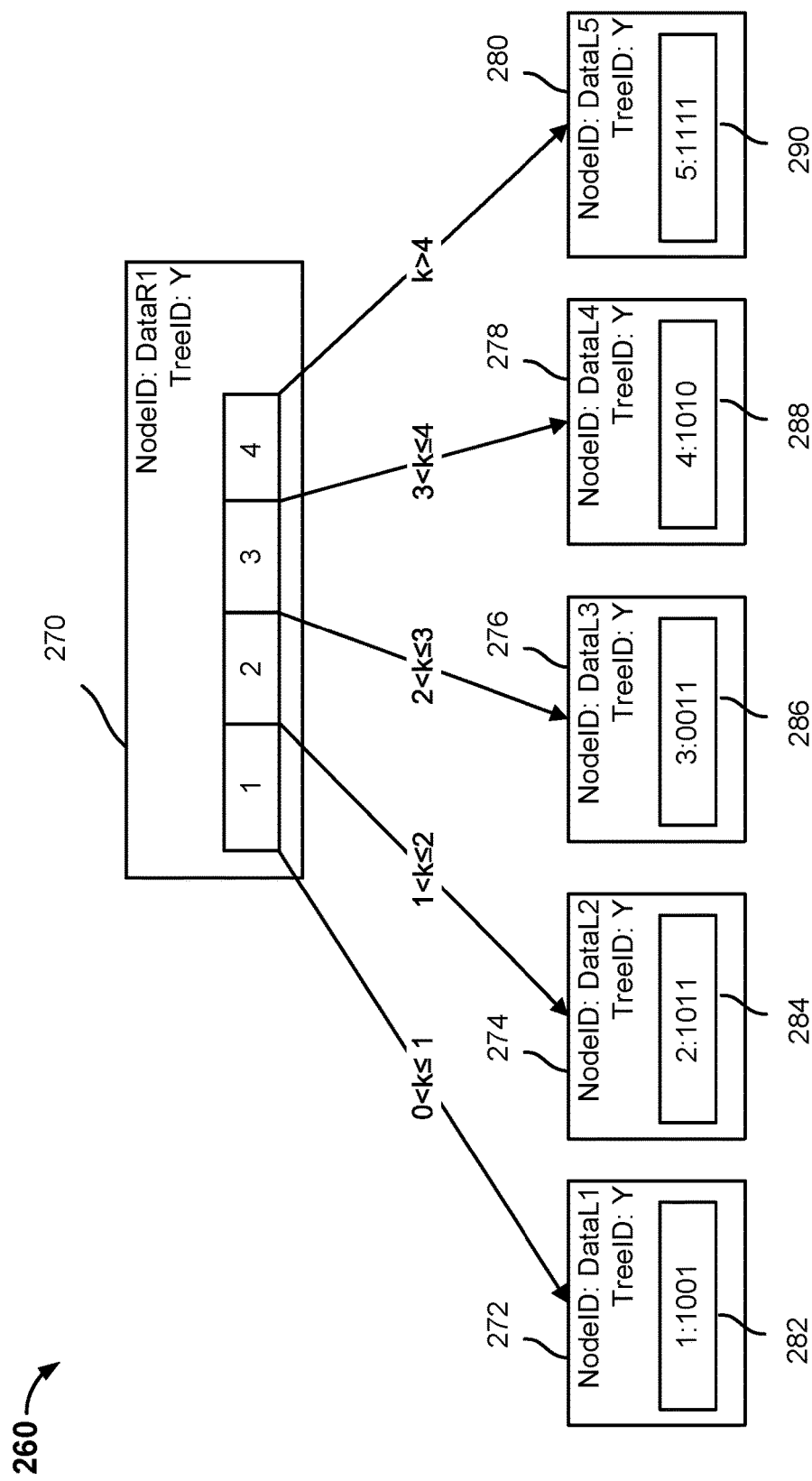
FIG. 2E is a block diagram illustrating an embodiment of leaf node data.

FIG. 2E is a block diagram illustrating an embodiment of leaf node data. In the example shown, leaf node 260 may be leaf node 222, 224, 226, 228, 230. A tree data structure may be used to store data related to a value associated with a leaf node. In some embodiments, a leaf node, such as leaf node 222, 224, 226, 228, 230, may include a pointer to a tree data structure, such as the tree data structure depicted in FIG. 2E.

In the example shown, leaf node 260 includes a data root node 270 and data leaf nodes 272, 274, 276, 278, and 280. A leaf node may include one or more intermediate nodes, similar to the tree data structure depicted in FIG. 2A. Data root node 270 includes a NodeID and a TreeID. Data root node 270 also includes a set of node keys. Data root node 270 includes a first node key of "1," a second node key of "2," a third node key of "3," and a fourth node key of "4." The data key k for data leaf node 272 is a value that is less than or equal to the first node key. Data leaf node 272 includes a data block 282 that stores bits of ones and zeros. Although data block 282 is depicted as storing the bit pattern "1001," a data block may store any bit pattern. Data leaf node 272 may include a pointer to a physical location that stores the data.

The data key k for data leaf node 274 is a value that is greater than the first node key and less than or equal to the second node key. Data leaf node 274 includes a data block 284 that stores bits of ones and zeros. Although data block 284 is depicted as storing the bit pattern "1011," a data block may store any bit pattern. Data leaf node 274 may include a pointer to a physical location that stores the data.

The data key k for data leaf node 276 is a value that is greater than the second node key and less than or equal to the third node key. Data leaf node 276 includes a data block 286 that stores bits of ones and zeros. Although data block 286 is depicted as storing the bit pattern "0011," a data block may store any bit pattern. Data leaf node 276 may include a pointer to a physical location that stores the data.

The data key k for data leaf node 278 is a value that is greater than the third node key and less than or equal to the fourth node key. Data leaf node 278 includes a data block 288 that stores bits of ones and zeros. Although data block 288 is depicted as storing the bit pattern "1010," a data block may store any bit pattern. Data leaf node 278 may include a pointer to a physical location that stores the data.

The data key k for data leaf node 280 is a value that is greater than the fourth node key. Data leaf node 280 includes a data block 290 that stores bits of ones and zeros. Although data block 290 is depicted as storing the bit pattern "1111," a data block may store any bit pattern. Data leaf node 280 may include a pointer to a physical location that stores the data.

For example FIGS. 2A-2E and 3A-3D describe snapshot trees. FIG. 2A is a block diagram illustrating an embodiment of a tree data structure storing file system data. In the example shown, tree data structure 200 may be created by a storage system, such as secondary storage system 104. In the example shown, tree data structure 200 is a snapshot tree that includes a root node 202, intermediate nodes 212, 214, and leaf nodes 222, 224, 226, 228, and 230. Although tree data structure 200 includes one intermediate level between root node 202 and leaf nodes 222, 224, 226, 228, and 230, there could be any number of intermediate levels in a snapshot tree. Tree data structure 200 may be a snapshot tree of file system data at a particular point in time t. Tree data structure 200 may correspond to a version of a snapshot tree. Root node 202 is associated with the snapshot of the file system data at the particular point in time t. In some embodiments, the file system data is metadata for a distributed file system and may include information, such as file size, directory structure, file permissions, physical storage locations of the files, etc.

A root node is the root of a snapshot tree and may include pointers to one or more other nodes. Each pointer includes a range of numerical and sorted data keys that can be found by following that particular pointer. An intermediate node is a node to which another node points (e.g., root node, other intermediate node) and includes one or more pointers to one or more other nodes. A leaf node is a node at the bottom of a snapshot tree. In some embodiments, a leaf node is a node to which another node points, but does not include a pointer to any other node. In other embodiments, a leaf node is a node to which another node points and includes a pointer to the root node of another snapshot tree. A leaf node may store key-value pairs of file system data. A data key k is a lookup value by which a particular leaf node may be accessed. For example, "1" is a data key that may be used to lookup "DATA1" of leaf node 222. Examples of values stored by a leaf node include, but are not limited to, file size, directory structure, file permissions, physical storage locations of the files, etc. A leaf node may store a data key k and a pointer to a location that stores the value associated with the data key.

A root node or an intermediate node may include one or more node keys. The node key may be an integer value or a non-integer value. Each node key indicates a division between the branches of the node and indicates how to traverse the tree data structure to find a leaf node, i.e., which pointer to follow. For example, root node 202 may include a node key of "3." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2," and "3" are less than or equal to the node key "3." To find a leaf node storing a value associated with a data key of "4" or "5," the second branch of root node 202 would be traversed to intermediate node 214 because data keys "4" and "5" are greater than the node key of "3."

A data key k of a key-value pair is not limited to a numerical value. In some embodiments, non-numerical data keys may be used for a data key-value pair (e.g., "name," "age," etc.) and a numerical number may be associated with the non-numerical data key. For example, a data key of "name" may correspond to a numerical key of "4." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function applied to a data key to provide a hash. The hash may determine which branch of a node with which the non-numerical data key is associated.

In the example shown, root node 202 includes a pointer to intermediate node 212 and a pointer to intermediate node 214. Root node 202 includes a NodeID of "R1" and a TreeID of "1." The NodeID identifies the name of the node. The TreeID identifies the snapshot/view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing snapshot tree 200 from root node 202 to intermediate node 212 because the data keys have a value that is less than or equal to the node key. Leaf nodes with a data key of "4" or "5" may be found by traversing tree data structure 200 from root node 202 to intermediate node 214 because the data keys have a value that is greater than the node key.

Root node 202 includes a first set of pointers. The first set of pointers associated with a data key less than the node key (e.g., "1," "2," or "3") indicates that traversing tree data structure 200 from root node 202 to intermediate node 212 will lead to a leaf node with a data key of "1," "2," or "3." Intermediate node 214 includes a second set of pointers. The second set of pointers associated with a data key greater than the node key indicates that traversing tree data structure 200 from root node 202 to intermediate node 214 will lead to a leaf node with a data key of "4" or "5."

Intermediate node 212 includes a pointer to leaf node 222, a pointer to leaf node 224, and a pointer to leaf node 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes a pointer to leaf node 228 and a pointer to leaf node 230. Intermediate node 214 includes a NodeID of "I2" and a TreeID of "1." Intermediate node 214 includes a node key of "4." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "4." The pointer to leaf node 230 indicates that traversing tree data structure 200 from intermediate node 214 to leaf node 230 will lead the node with a data key of "5."

Leaf node 222 includes a data key-value pair of "1: DATA1." Leaf node 222 includes NodeID of "L1" and a TreeID of "1." To view the value associated with a data key of "1," tree data structure 200 is traversed from root node 202 to intermediate node 212 to leaf node 222.

Leaf node 224 includes a data key-value pair of "2: DATA2." Leaf node 224 includes NodeID of "L2" and a TreeID of "1." To view the value associated with a data key of "2," tree data structure 200 is traversed from root node 202 to intermediate node 212 to leaf node 224.

Leaf node 226 includes a data key-value pair of "3: DATA3." Leaf node 226 includes NodeID of "L3" and a TreeID of "1." To view the value associated with a data key of "3," tree data structure 200 is traversed from root node 202 to intermediate node 212 to leaf node 226.

Leaf node 228 includes a data key-value pair of "4: DATA4." Leaf node 228 includes NodeID of "L4" and a TreeID of "1." To view the value associated with a data key of "4," tree data structure 200 is traversed from root node 202 to intermediate node 214 to leaf node 228.

Leaf node 230 includes a data key-value pair of "5: DATA5." Leaf node 230 includes NodeID of "L5" and a TreeID of "1." To view the value associated with a data key of "5," tree data structure 200 is traversed from root node 202 to intermediate node 214 to leaf node 230.

FIG. 2B is a block diagram illustrating an embodiment of cloning a snapshot tree of a tree data structure. In some embodiments, tree data structure 250 may be created by a storage system, such as secondary storage system 104. In the example shown, snapshot tree 250 includes a snapshot tree that is comprised of root node 204, intermediate nodes 212, 214, and leaf nodes 222, 224, 226, 228, and 230. Tree data structure 250 may be a snapshot of file system data at a particular point in time t+n. The tree data structure allows a chain of snapshot trees to be linked together. Each time a snapshot is performed, a root node of the snapshot tree may be linked to one or more intermediate nodes associated with a previous snapshot tree. In the example shown, the snapshot tree at time t+n is linked to the snapshot tree at time t. To create a snapshot tree of the file system data at time t+n, a copy of the previous root node is created. The root node copy includes the same set of pointers as the original node. However, the root node copy also includes a different NodeID and a different TreeID than the original. The TreeID is the identifier associated with a view. Root node 204 is associated with the snapshot of the file system data at the particular point in time t+n. Root node 202 is associated with the snapshot of the file system data at the particular point in time t. The snapshot tree at time t+n may correspond to a version of a snapshot tree. In some embodiments, the snapshot tree at time t+n is a current view of the file system metadata. A current view may still accept one or more changes to the data. The TreeID of a root node indicates a snapshot with which the root node is associated. For example, root node 202 with a TreeID of "1" is associated with a first snapshot and root node 204 with a TreeID of "2" is associated with a second snapshot. In other embodiments, the snapshot tree at time t+n is a snapshot view of the file system metadata. A snapshot view may not accept any changes to the data.

In some embodiments, to create a snapshot of the file system at time t+n, two root node copies are created. Providing two new root nodes, each with a different TreeID prevents updates made to a particular view (e.g., current view) from affecting nodes of a different view (e.g., snapshot view). One of the new root nodes may be associated with a current view (i.e., modifiable) and the other new root node may be associated with a snapshot view (i.e., not modifiable). In some embodiments, a root node associated with a previous snapshot is deleted after a snapshot is performed, i.e., root node 202 is deleted after root node 204 is created.

In the example shown, root node 204 is a copy of root node 202. Similar to root node 202, root node 204 includes the same pointers as root node 202, except that root node 204 includes a different node identifier and a different view identifier. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 will lead to a leaf node with a data key of "4" or "5." Root node 204 includes a NodeID of "R2" and a TreeID of "2." The NodeID identifies the name of the node. The TreeID identifies the snapshot with which the node is associated.

FIG. 2C is a block diagram illustrating an embodiment of modifying a snapshot tree. In the example shown, tree data structure 255 may be modified by a file system manager, such as file system manager 105. Tree data structure 255 may be a current view of the file system data at time t+n. A current view may still accept one or more changes to the data. Because a snapshot represents a perspective of the file system metadata that is "frozen" in time, one or more copies of one or more nodes affected by a change to file system metadata are made. Tree data structure 255 may include a root node that corresponds to a version of a snapshot tree.

In the example shown, the value "DATA4" has been modified to be "DATA4'." At time t+n, the file system manager starts at root node 204 because that is the root node associated with snapshot tree at time t+n. The value "DATA4" is associated with the data key "4." The file system manager traverses tree data structure 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 204 and proceeds to intermediate node 214. The file system manager compares the TreeID of intermediate node 214 with the TreeID of root node 204 (the identifier associated with a snapshot at time t=t+n), determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a set of pointers of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228. Leaf node copy 232 stores the modified value "DATA4'" and includes the same TreeID as root node 204. The file system manager updates a pointer of intermediate node 216 to point to leaf node 232 instead of pointing to leaf node 228.

FIG. 2D is a block diagram illustrating an embodiment of a modified snapshot tree of a tree data structure. The tree data structure 255 shown in FIG. 2D illustrates a result of the modifications made to tree data structure 255 as described with respect to FIG. 2C.

FIG. 2E is a block diagram illustrating an embodiment of leaf node data. In the example shown, leaf node 260 may be leaf node 222, 224, 226, 228, 230. A tree data structure may be used to store data related to a value associated with a leaf node. In some embodiments, a leaf node, such as leaf node 222, 224, 226, 228, 230, may include a pointer to a tree data structure, such as the tree data structure depicted in FIG. 2E.

In the example shown, leaf node 260 includes a data root node 270 and data leaf nodes 272, 274, 276, 278, and 280. A leaf node may include one or more intermediate nodes, similar to the tree data structure depicted in FIG. 2A. Data root node 270 includes a NodeID and a TreeID. Data root node 270 also includes a set of node keys. Data root node 270 includes a first node key of "1," a second node key of "2," a third node key of "3," and a fourth node key of "4." The data key k for data leaf node 272 is a value that is less than or equal to the first node key. Data leaf node 272 includes a data block 282 that stores bits of ones and zeros. Although data block 282 is depicted as storing the bit pattern "1001," a data block may store any bit pattern. Data leaf node 272 may include a pointer to a physical location that stores the data.

The data key k for data leaf node 274 is a value that is greater than the first node key and less than or equal to the second node key. Data leaf node 274 includes a data block 284 that stores bits of ones and zeros. Although data block 284 is depicted as storing the bit pattern "1011," a data block may store any bit pattern. Data leaf node 274 may include a pointer to a physical location that stores the data.

The data key k for data leaf node 276 is a value that is greater than the second node key and less than or equal to the third node key. Data leaf node 276 includes a data block 286 that stores bits of ones and zeros. Although data block 286 is depicted as storing the bit pattern "0011," a data block may store any bit pattern. Data leaf node 276 may include a pointer to a physical location that stores the data.

The data key k for data leaf node 278 is a value that is greater than the third node key and less than or equal to the fourth node key. Data leaf node 278 includes a data block 288 that stores bits of ones and zeros. Although data block 288 is depicted as storing the bit pattern "1010," a data block may store any bit pattern. Data leaf node 278 may include a pointer to a physical location that stores the data.

The data key k for data leaf node 280 is a value that is greater than the fourth node key. Data leaf node 280 includes a data block 290 that stores bits of ones and zeros. Although data block 290 is depicted as storing the bit pattern "1111," a data block may store any bit pattern. Data leaf node 280 may include a pointer to a physical location that stores the data.

Figure 3A:
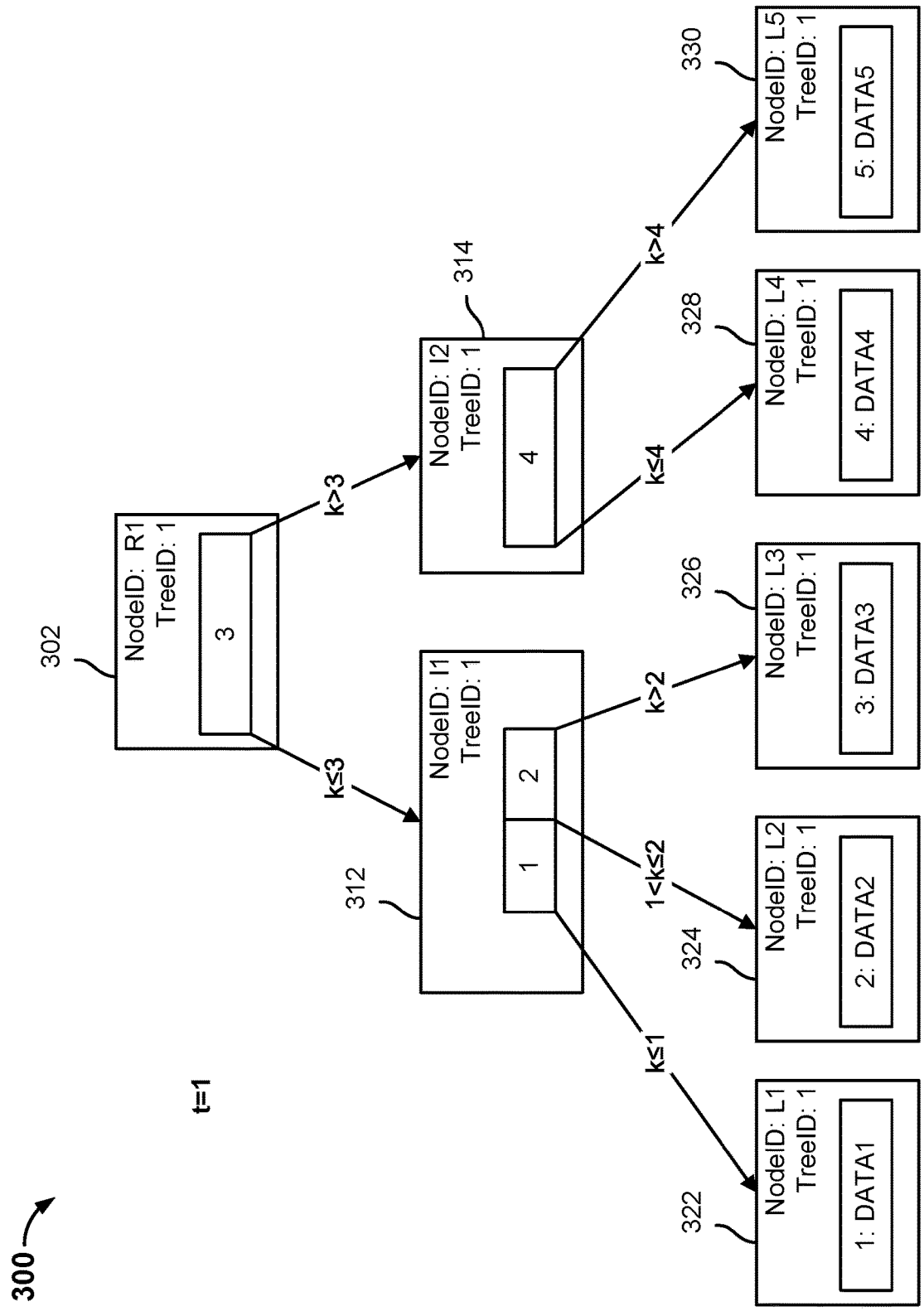
FIG. 3A is a block diagram illustrating an embodiment of a snapshot tree at a particular moment in time.

FIG. 3A is a block diagram illustrating an embodiment of a tree data structure at a particular moment in time. In the example shown, tree data structure 300 is a snapshot tree at time t=1. At t=1, tree data structure 300 includes a root node 302, intermediate nodes 312, 314, and leaf nodes 322, 324, 326, 328, 330. At t=1, tree data structure 300 is similar to the tree data structure 200 shown in FIG. 2A. Tree data structure 300 may correspond to a version of a snapshot tree.

A full snapshot or an incremental snapshot of the snapshot tree at time t=1 may be performed and stored on the storage system. The full snapshot may provide a complete view of the tree data structure at a particular point in time, that is, the full snapshot stores all of the nodes associated with a snapshot at the particular moment in time. For example, a full snapshot at time t=1 would include root node 302, intermediate nodes 312, 314, leaf nodes 322, 324, 326, 328, and 330. An incremental snapshot may provide a partial view of the tree data structure at a particular time. However, in this instance, an incremental snapshot at time t=1 would also include root node 302, intermediate nodes 312, 314, leaf nodes 322, 324, 326, 328, and 330 because those nodes have not been previously stored.

Figure 3B:
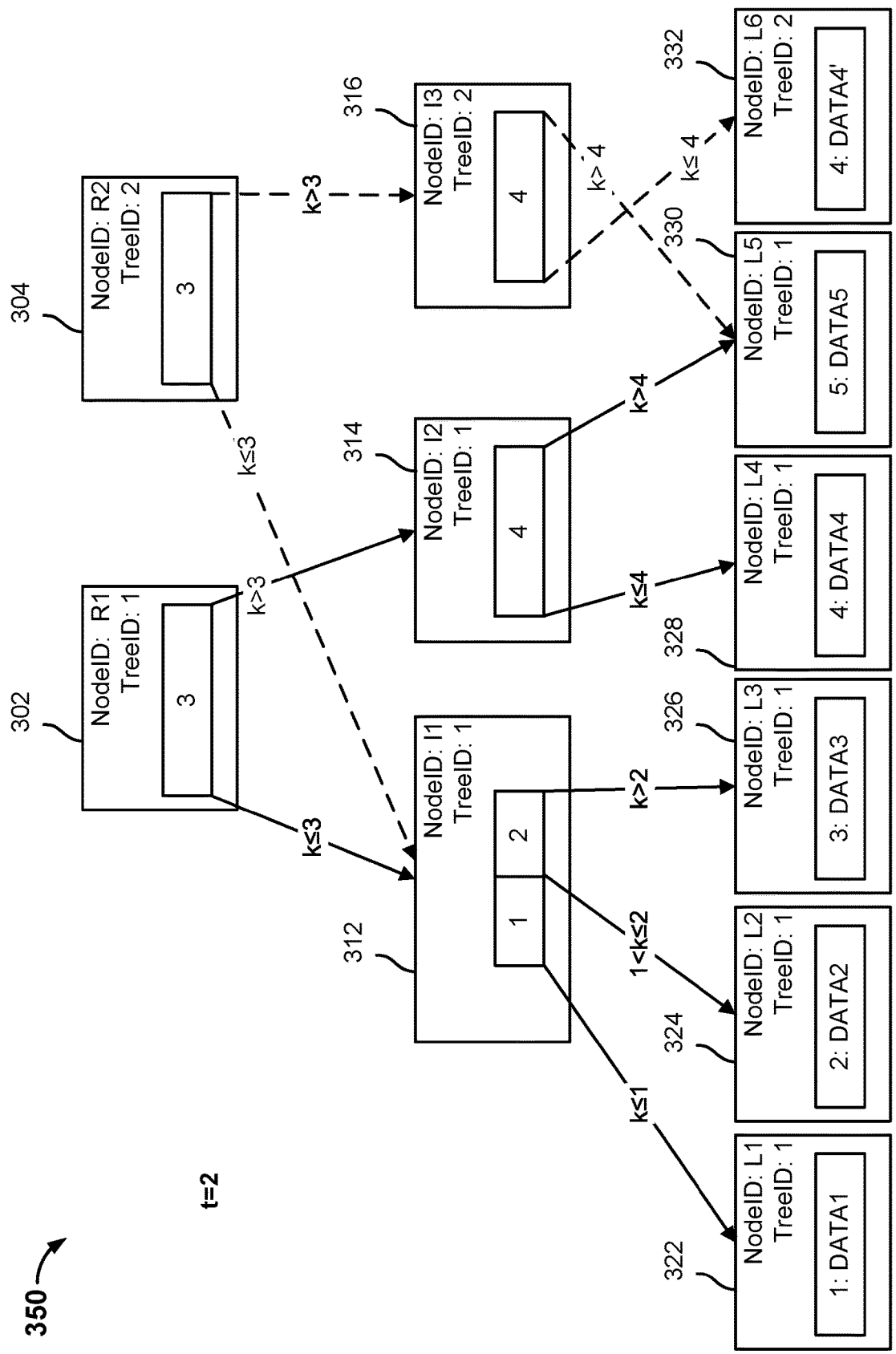
FIG. 3B is a block diagram illustrating an embodiment of a snapshot tree at a particular moment in time.

FIG. 3B is a block diagram illustrating an embodiment of a tree data structure at a particular moment in time. The tree data structure allows a chain of snapshot trees to be linked together. Each time a snapshot is performed, a root node of the snapshot tree may be linked to one or more intermediate nodes associated with a previous snapshot tree. In the example shown, the snapshot tree at time t=2 is linked to the snapshot tree at time t=1. At t=2, the snapshot tree includes root node 304, intermediate nodes 312, 316, and leaf nodes 322, 324, 326, 330, 332. Root node 302 is associated with a snapshot at time t=1 and root node 304 is associated with a snapshot at time t=2. At t=2, the tree data structure 350 is similar to the tree data structure 255 shown in FIG. 2D. The snapshot tree at time t=2 is a modified version of snapshot tree at time t=1 (i.e., the value of "DATA4" has been modified to be "DATA4'"). The snapshot at t=2 may correspond to a version of a snapshot tree.

A full snapshot or an incremental snapshot of the snapshot tree at t=2 may be performed and stored on the storage system. The full snapshot may provide a complete view of the tree data structure at a particular point in time, that is, the full snapshot stores all of the nodes associated with a snapshot tree at the particular moment in time. For example, a full snapshot at time t=2 would include root node 304, intermediate nodes 312, 316, leaf nodes 322, 324, 326, 330, 332, but would not include root node 302, intermediate node 314, and leaf node 328 because those nodes are not associated with the snapshot at time t=2, i.e., a node of a snapshot at time t=2 does not include a pointer to any of those nodes. An incremental snapshot may provide a partial view of the tree data structure at a particular time. The incremental snapshot may store each of the nodes associated with the snapshot tree at the particular moment in time that have not been previously stored. For example, an incremental snapshot at time t=2 would include root node 304, intermediate node 316, and leaf node 332, but in contrast to the full snapshot at t=1, would not include intermediate node 312 and leaf nodes 322, 324, 326, and 330 because those nodes were previously stored at time t=1.

Figure 3C:
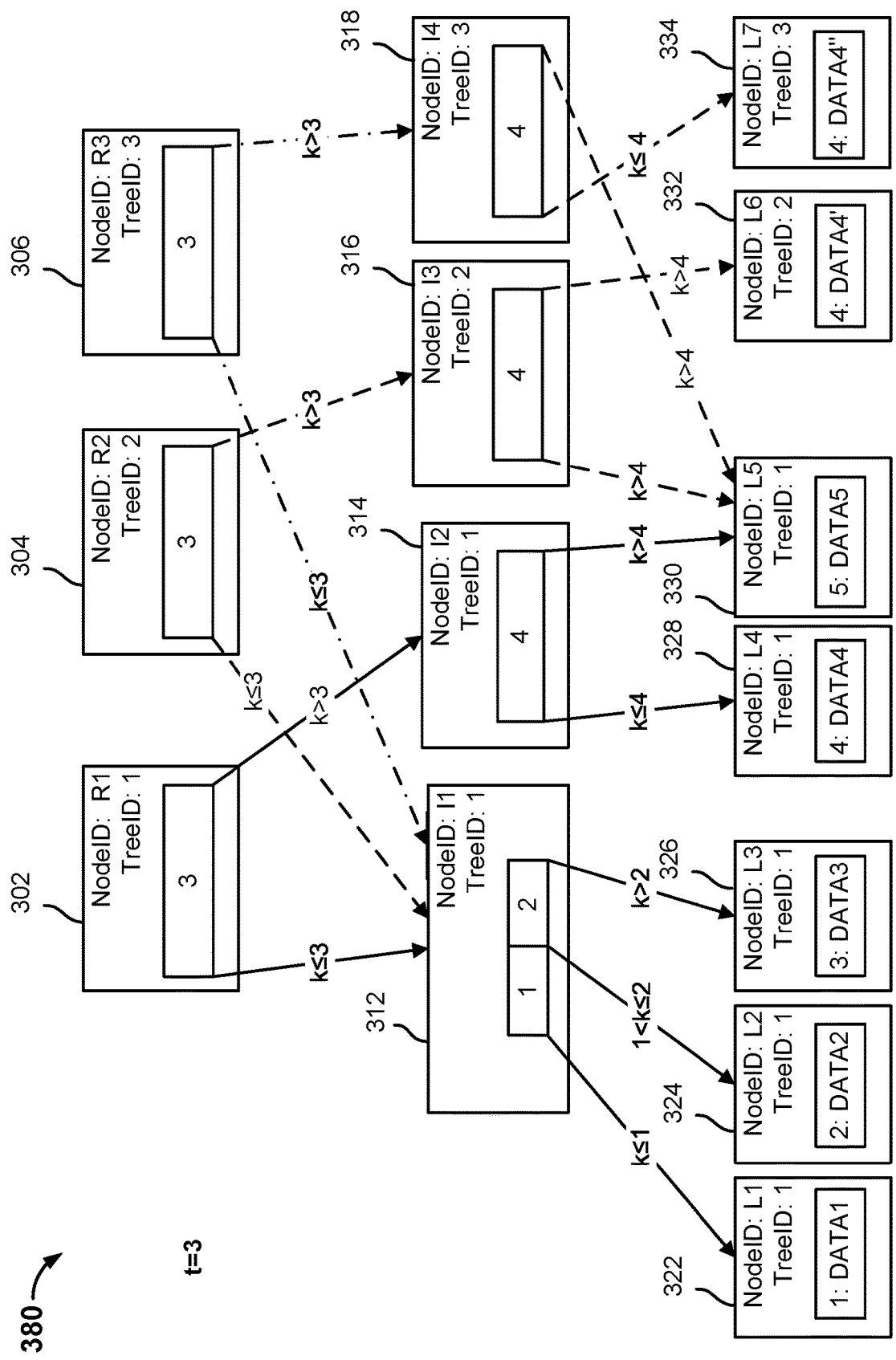
FIG. 3C is a block diagram illustrating an embodiment of a snapshot tree at a particular moment in time.

FIG. 3C is a block diagram illustrating an embodiment of a tree data structure at a particular moment in time. In the example shown, tree data structure 380 includes a snapshot tree at time t=3. The tree data structure allows a chain of snapshot trees to be linked together. Each time a snapshot is performed, a root node of the snapshot tree may be linked to one or more intermediate nodes associated with a previous snapshot tree. In the example shown, the snapshot tree at t=3 is linked to the snapshot trees at t=1, 2. At t=3, the snapshot tree includes root nodes 306, intermediate nodes 312, 318, and leaf nodes 322, 324, 326, 330, 334. Root node 302 is associated with a snapshot at time t=1, root node 304 is associated with a snapshot at time t=2, and root node 306 is associated with a snapshot at time t=3. Snapshot tree 380 is a modified version of the snapshot at t=2 (i.e., the value of "DATA4'" has been modified to be "DATA4''"). The snapshot tree at t=3 may correspond to a version of a snapshot tree.

A full snapshot or an incremental snapshot of the snapshot tree at t=3 may be performed and stored on the storage system. The full snapshot may provide a complete view of the tree data structure at a particular point in time, that is, the full snapshot stores all of the nodes associated with a snapshot at the particular moment in time. For example, a full snapshot at time t=3 would include root node 306, intermediate nodes 312, 318, leaf nodes 322, 324, 326, 330, 334, but would not include root nodes 302, 304, intermediate nodes 314, 316 and leaf nodes 328, 332 because those nodes are not associated with the snapshot at time t=3, i.e., a node of a snapshot at time t=3 does not include a pointer to any of those nodes. An incremental snapshot may provide a partial view of the tree data structure at a particular time. The incremental snapshot may store each of the nodes associated with the snapshot tree at the particular moment in time that have not been previously stored. For example, an incremental snapshot at time t=3 would include root node 306, intermediate node 318, and leaf node 334, but in contrast to the full snapshot at t=3, would not include intermediate node 312 and leaf nodes 322, 324, 326, and 330 because those nodes were previously stored at time t=1.

Figure 3D:
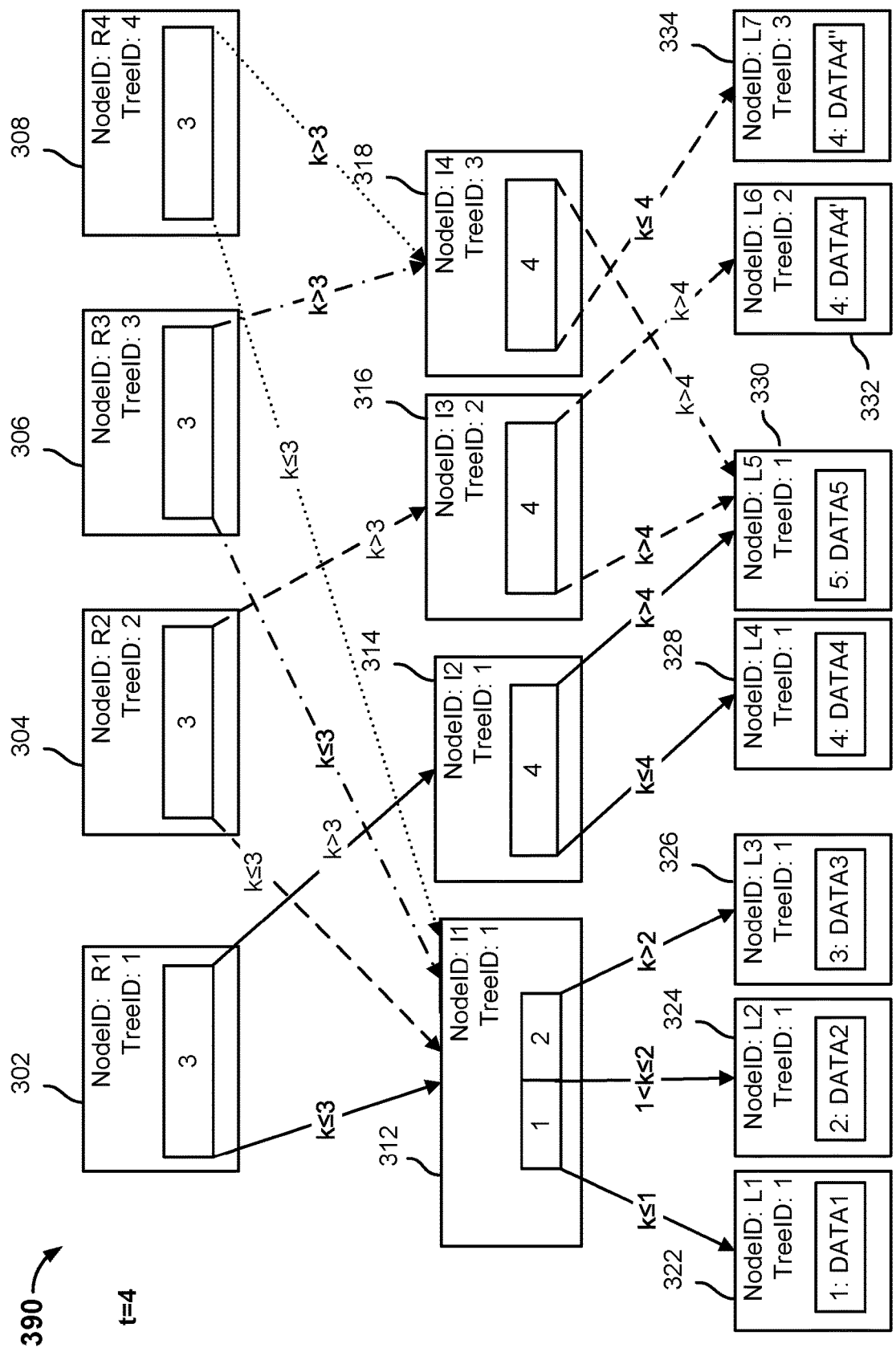
FIG. 3D is a block diagram illustrating an embodiment of a snapshot tree at a particular moment in time.

FIG. 3D is a block diagram illustrating an embodiment of a tree data structure at a particular moment in time. In the example shown, tree data structure 390 includes a snapshot tree at time t=4. The tree data structure allows a chain of snapshot trees to be linked together. Each time a snapshot is performed, a root node of the snapshot tree may be linked to one or more intermediate nodes associated with a previous snapshot tree. In the example shown, the snapshot tree at time t=4 is linked to the snapshot trees at times t=1, 2, 3. At t=4, the snapshot tree includes root node 308, intermediate nodes 312, 318, and leaf nodes 322, 324, 326, 330, 334. Root node 302 is associated with a snapshot at time t=1, root node 304 is associated with a snapshot at time t=2, root node 306 is associated with a snapshot at time t=3, and root node 308 is associated with a snapshot at time t=4. The snapshot tree at time t=4 may correspond to a version of a snapshot tree.

A full snapshot or an incremental snapshot of the snapshot tree at time t=4 may be performed and stored on the storage system. The full snapshot may provide a complete view of the tree data structure at a particular point in time, that is, the full snapshot stores all of the nodes associated with a snapshot at the particular moment in time. For example, a full snapshot at time t=4 would include root node 308, intermediate nodes 312, 318, leaf nodes 322, 324, 326, 330, 334, but would not include root nodes 302, 304, 306 intermediate nodes 314, 316 and leaf nodes 328, 332 because those nodes are not associated with the snapshot at time t=4, i.e., a node of a snapshot at time t=4 does not include a pointer to any of those nodes. An incremental snapshot may provide a partial view of the tree data structure at a particular time. The incremental snapshot may store each of the nodes associated with the snapshot tree at a particular moment in time that has not been previously stored. For example, an incremental snapshot at time t=4 would include root node 308, but in contrast to the full snapshot at t=4, would not include intermediate nodes 312, 318 and leaf nodes 322, 324, 326, 330, 334 because those nodes were previously stored at time t=1 or t=3.

As seen in FIGS. 3B-3D, each snapshot tree builds off of a previous snapshot tree, that is, a chain of snapshot trees exists. Each snapshot tree is associated with a snapshot of the file system data. As more and more snapshots are created and linked, this may require a lot of storage to store the snapshots. To reduce the amount of storage needed to store the snapshots, a policy may indicate that after a full snapshot is performed at a particular point in time, one or more previous snapshots may be deleted from the storage system. In some embodiments, the one or more previous snapshots are deleted after a condition of a retention time policy has passed.

Thus, system 100 can provide backups of database 102 and store these on secondary storage 104. Using the log, incremental and full backups, database 102 can be restored to the desired point in time. If the point in time to which database 102 is desired to be restored coincides with a full or incremental backup, system 100 can simply use these backups to restore database 102. As discussed below, database 102 can also be restored to a point in time between full and incremental backups.

Figure 4:
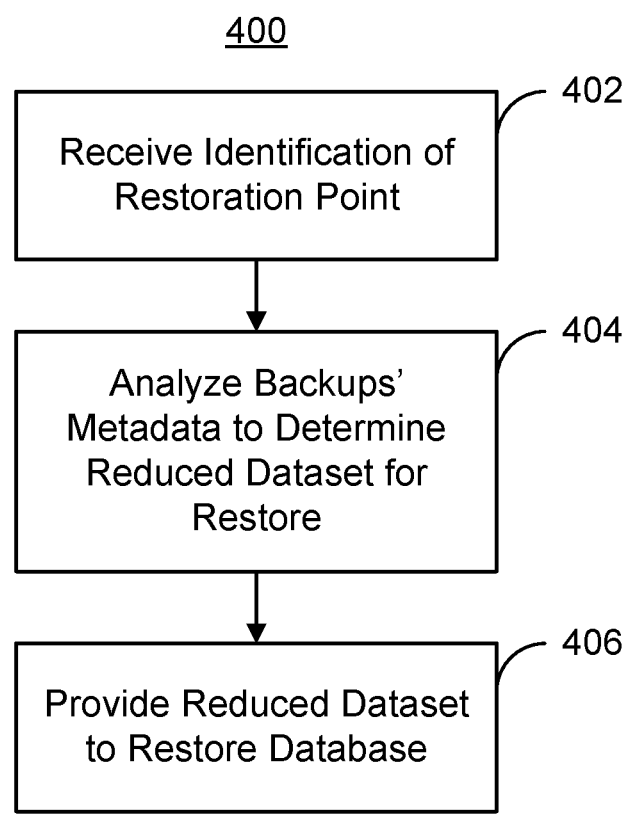
FIG. 4 is a flow chart illustrating an embodiment of a method for performing a point-in-time restoration of a database.

FIG. 4 is a flowchart depicting an exemplary embodiment of process 400 for performing a point-in-time restore of a database, such as database 102. Method 400 is described in the context of system 100. However, nothing prevents method 400 from use with other systems. Portions of method 400 may be performed in a different order than shown and may include sub-processes. Additional and/or other processes not inconsistent with the method and system described herein may also be performed. In some embodiments, method 400 is performed using processor(s) executing instruction(s) stored in memory or another non-transitory computer-readable medium.

An identification of a restoration point of database 102 is received, at 402. The restoration point is the time to which database 102 is desired to be restored. The restoration point can be received as part of a point-in-time restoration request. A point-in-time restoration request is used to restore database 102 to its status at the time of the restoration point. The restoration point may be indicated by a database time, such as an SCN, by a storage system time, by a transaction identification and/or in another manner. The request may be to restore the database to the original location or an alternate location.

Metadata from the backups is analyzed to identify a reduced dataset required to restore database 102 to the restoration point, at 404. The reduced dataset identified at 404 excludes data for transactions occurring after the restoration point. This is distinct from a dataset used in a conventional restoration, which includes data related to transactions occurring after the restoration point through the next backup. As discussed above, the time range covered by a backup is stored as part of the metadata for the backup. Thus, the backup that includes the restoration point within its time range can be identified by analyzing metadata for the backups. If the backup containing the restoration point in its time range is a full or incremental backup, then the full or incremental backup may be used to restore the database. For example, the snapshot for the full or incremental backup may be identified at 404 as the dataset required to restore the database to the restoration point.

If, however, the restoration point does not occur at a full or incremental backup, then the restoration point is within a time range covered by a log backup. The reduced dataset then includes additional information. The log backup that includes the restoration point within its time range is identified using metadata as part of 404. In addition, the closest full or incremental backup before the restoration point ("previous full or incremental backup") and log backups between the previous full or incremental backup and the log backup including the restoration point are identified. Thus, the reduced dataset determined at 404 includes the previous full or incremental backup and log file(s) from log backup(s) up to the restoration point. Log file(s) only including transactions occurring after the restoration point are not part of the reduced dataset. The previous full or incremental backup and previous log backups can be determined using the time ranges covered by backups. The log backup(s) between the previous full or incremental backup and the log backup including the restoration point have time ranges that include times (database time(s)/SCNs and/or storage system time(s)) that are after the previous full or incremental backup and before the backup including the restoration point. From the previous full or incremental backup and log backups, the last snapshot of the database and transactions to be applied to the last full or incremental backup to bring the status of the database to the restoration point are determined. However, log files and transactions occurring after the restoration point are not provided. Thus, the reduced dataset required to restore database 102 to the restoration point is determined by secondary storage system 104 at 404.

The reduced dataset is provided for use in restoring the database to the restoration point, at 406. Thus, the previous full or incremental backup and log files (or transactions therein) through the restoration point are provided. Log files after the restoration point are not needed to perform the point-in-time restoration and, therefore, are not provided for use. Consequently, a restoration of database 102 can be performed. Such a restoration merges the transactions up to the restoration point with the previous full or incremental backup.

Using method 400 a point-in-time restoration can be completed. Method 400 avoids requiring a user to select the dataset to be used in performing the restoration. Consequently, method 400 may be faster and less subject to error. In addition, only data required to bring database 102 to the restoration point are identified and provided for use in the restore. For example, log file(s) and transactions occurring after the restoration point are not provided for use in restoring database 102 to the restoration point. Consequently, fewer files may be provided in a shorter amount of time. Performing a point-in-time restoration may thus be more efficient.

Figure 5:
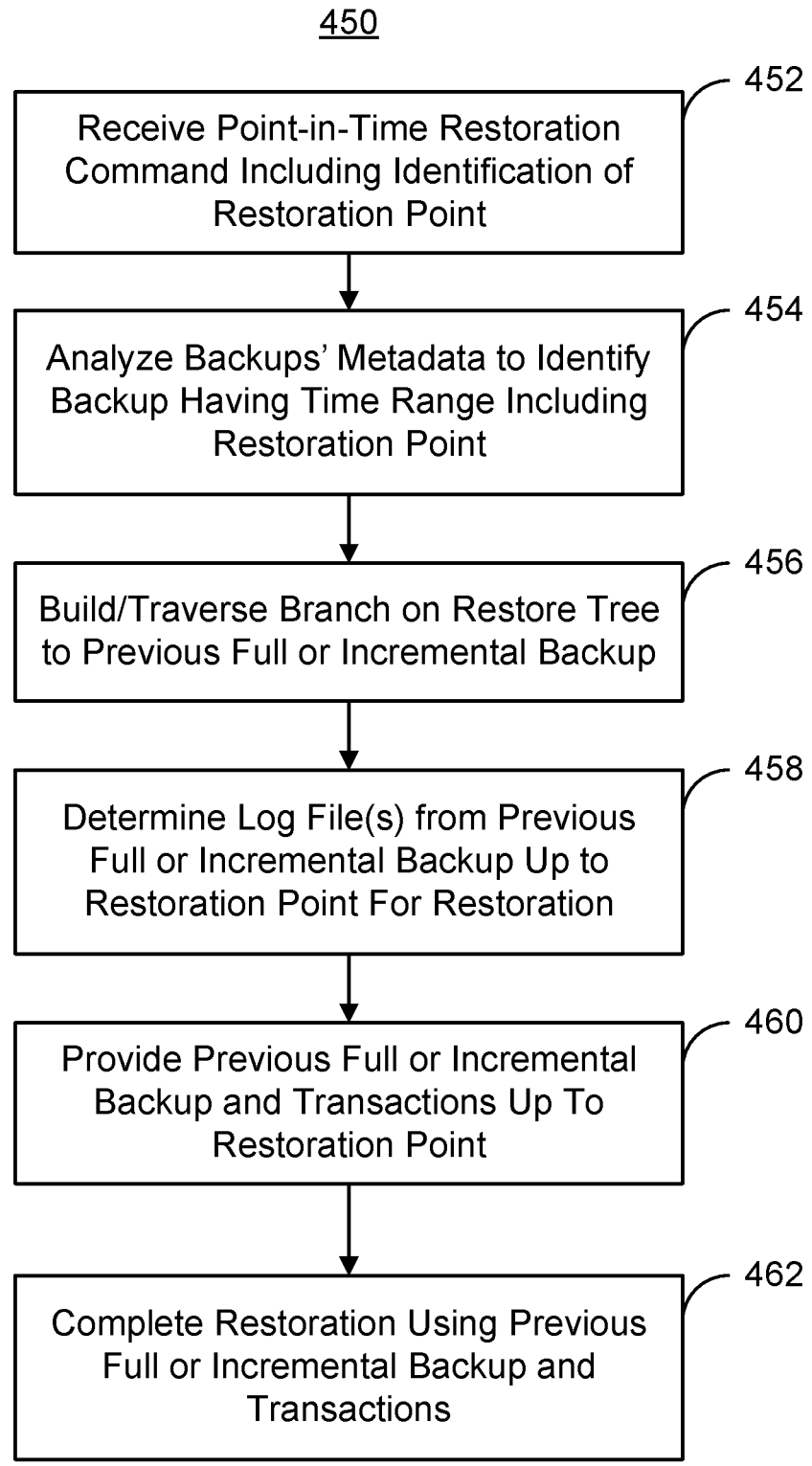
FIG. 5 is a flow chart illustrating an embodiment of a process for performing a point-in-time restoration of a database.

FIG. 5 is a flowchart depicting an exemplary embodiment of process 450 for performing a point-in-time restore of a database, such as database 102. Method 450 is described in the context of system 100. However, nothing prevents method 450 from use with other systems. Portions of method 450 may be performed in a different order than shown and may include sub-processes. Additional and/or other processes not inconsistent with the method and system described herein may also be performed. In some embodiments, method 450 is performed using processor(s) executing instruction(s) stored in memory or another non-transitory computer-readable medium.

A request for a point-in-time restoration of database 102 is received, at 452. The point-in-time restoration request includes the restoration point. In addition, the location to which the restoration is desired to be made may be provided at 452. The request may be provided by an administrator or other authorized user of database 102. In some embodiments, a timeline or other representation of the backups may be provided to the user. From this timeline, the user may select the restoration point, which is received at 452.

Metadata from the backups is analyzed at secondary storage system 104 to determine the backup having a time range that includes the restoration point, at 454. The metadata analyzed at 454 may be stored in one or more files corresponding to the backups that have been performed for database system 102. The file(s) include the database times (e.g. SCNs) and storage system times of transactions. The time range for each full backup, incremental backup or log backup is either included in the metadata or can be determined from the metadata. Thus, the backup that includes the restoration point can be identified at 454. Because log backups occur significantly more often than incremental of full backups, this backup is frequently a log backup. Method 450 is discussed in the context of a log backup being identified at 454.

At 456, a restore tree for database 102 is traversed to determine the full, incremental, or fully hydrated incremental backup occurring before and as close as possible in time to the log backup identified at 454. Stated differently, the previous full or incremental backup and intervening log backups are determined at 456. A restore tree includes nodes for all of the backups that have been completed. Restore trees start at full or incremental backups. Branches start at restoration points and terminate once a new full or incremental backup or restoration is performed. As such, the nodes along a branch of the restore tree correspond to log backups. Traversing the restore tree at 456 can be accomplished using the database time and storage system time for each backup. Thus, the complete tree from the first backup for database 102 to the backup identified at 454 need not be traversed. Instead, only the portion of the restore tree including nodes/log backups from the log backup identified at 454 through the previous full or incremental backup is utilized. As part of 456, it is ensured that the previous full or incremental backup and the log backup identified at 454 are on the same branch of the restore tree.

To traverse the restore tree at 456, the time range covered (database and/or storage system), incarnation ID and reset log ID for a backup are used. As discussed above, the time range for each backup is stored or identifiable from metadata. Starting from the log backup identified at 454, log backups having time ranges (database time/SCN and/or storage system time) earlier than that of the log backup of 454 and after that of the previous full or incremental backup may be part of the path to the previous full or incremental backup. However, if there was an intervening restore, log backups having an earlier time range may not correspond to a node that is traversed to reach the previous full or incremental backup. Stated differently, some log backups having an earlier time range may not be on the same branch as the log backup identified at 454. Consequently, the incarnation ID and reset log id, in combination with the time/SCN range, can be used to ensure that the correct backups are part of the restore tree built/traversed at 456. More specifically, the log backup including the restoration point, the previous full or incremental backup and any log backups between the previous full or incremental backup and the log backup including the restoration point share incarnation IDs and reset log IDS or have a parent/child relationship (described below) between incarnation IDs and reset log IDs are part of the restore tree of 456. These backups are identified as part of 456. Thus, the previous full or incremental backup and any log backups on the restore tree and between the previous full or incremental backup and the restoration point are identified at 456.

The log file(s) from the previous full or incremental backup to the restoration point are identified at 458. This may be accomplished by identifying the log files for each log backup for each node in the portion of the restore tree traversed/built at 456. As part of 458, the transactions for the log files may also be determined. Consequently, all transactions from the previous full or incremental backup up to the restoration point can be determined at 458. For the log backup identified at 454, only log files and transactions up to and including the restoration point are identified. For example, suppose a log backup identified at 454 contains two transactions occurring before the restoration point and four transactions after the restoration point. The previous full or incremental backup, log files/transactions from intervening log backups and the two transactions obtained before the restoration point are identified at 458. The four transactions occurring after the restoration point are not used in restoring database 102 and thus not identified at 458.

The previous full or incremental backup and log files (or transactions) through the restoration point are provided for use in restoring database 102, at 460. Database 102 can then be restored in accordance with the point-in-time restoration command, at 462. For example, the files for the full or incremental backup and log backups may be cloned at 462 and stored as a temporary view. Because of the use of snaptrees, described below, cloning may be performed quickly and efficiently. This temporary view is the view of database 102 at the restoration point. Thus, the temporary view can be used to restore database 102 to the restoration point. Once the restoration is complete, the temporary view may be deleted.

Figure 6:
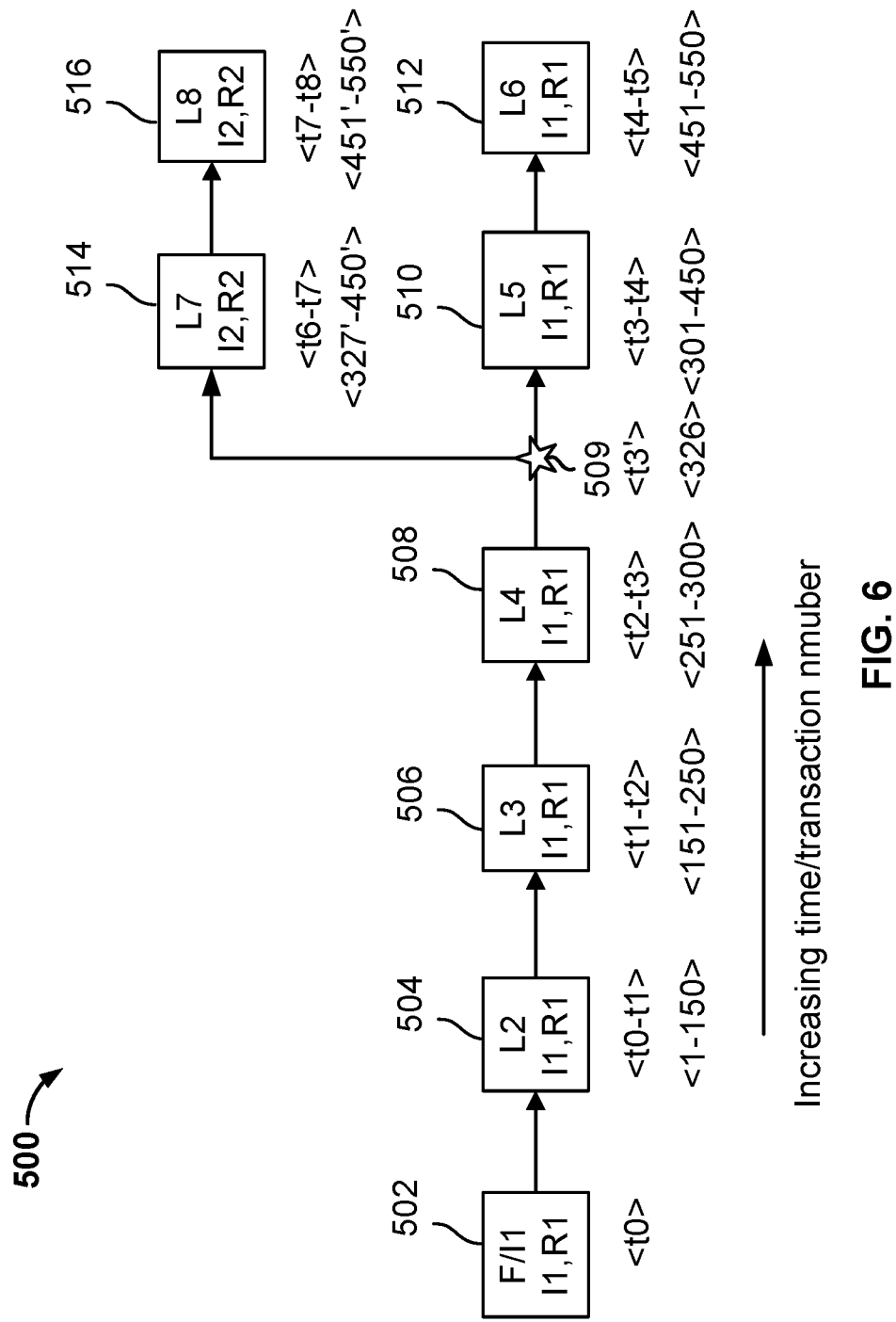
FIG. 6 is a diagram of an exemplary embodiment of a restore tree.

Method 450 may be further explained in the context of FIG. 6. FIG. 6 is an exemplary embodiment of a portion of a restore tree 500. In some embodiments, restore tree 500 is generated during backups and restores of database 102. Thus, portions of restore tree 500 are created as part of method 450, while other portions are created as database 102 undergoes backups during normal operation. Restore tree 500 has nodes 502, 504, 506, 508, 510, 512, 514 and 516. Each node 502, 504, 506, 508, 510, 512, 514 and 516 corresponds to a backup. Because each node of restore tree 500 corresponds to a backup, the item number and name (e.g. L2 504) for FIG. 5 refers interchangeably to nodes and backups. As discussed above, a new branch in the restore tree is created by an overwrite restore. Thus, node 502 is a full or incremental backup F/I1 taken performed at storage system time t0. In the embodiment shown, no previous restores were performed. In some embodiments, node 502 is for a full backup. The incarnation ID and reset log ID are I1 and R1, respectively. The remaining backups shown in restore tree 500 are log backups. Thus, nodes 504, 506, 508, 510, 512, 514 and 516 are log backups L2, L3, L4, L5, L6, L7 and L8, respectively. Each backup has a corresponding time range and a corresponding number of transactions. The transactions/times included in a backup are those occurring since the previous backup. For example, log backup L2 504 may occur at time t1, have a time range from t0 through t1, and correspond to transactions one through one hundred fifty. Log backup L2 504 has a time range from just after t1 through t2 and includes transactions one hundred fifty one through two hundred fifty, and so on.

A point-in-time restoration request for database 102 is received at 452. The restoration point is time t3' 509, which is between t3 and t4. In other embodiments, the restoration point may be given by a transaction number (e.g. 326), an SCN, or other measure of secondary storage or database time. The restoration point t3 509 is denoted on FIG. 6 by a star. For simplicity, time t3' and the corresponding restoration point are both discussed as having designation 509.

The metadata for backups in restore tree 500 is analyzed, at 454. Secondary storage system 104 determines that log backup L5 510 includes time t3' 509 in its time range. This restoration point 509 is after transaction 326 has occurred bit before transaction 327 (not explicitly shown in FIG. 6). As can be seen in FIG. 6, this corresponds to restoration point 509 being after log backup L4 508 occurs and before log backup L5 510 occurs. Thus, restoration point 509, or t3', is within the time range t3 through t4 for log backup L5 510 and within transactions 301 through 450. Consequently, log backup L5 510 is identified at 454.

Restore tree 500 is traversed at 456. In some embodiments, restore tree 500 is built as each backup occurs. Once node L5 510 is identified in 454, restore tree is traversed at 456. Alternatively, metadata for backups may be analyzed at 454, backup L5 510 identified, and portions of the restore tree 500 generated after backup L5 510 is identified. At 456, nodes 508, 506 and 504 are traversed to locate closest previous full or incremental backup F/I1 502. Thus, previous full or incremental backup F/I1 502 is identified. Previous full or incremental backup F/I1 502 is both along the same restore tree branch as backup L5 510 and occurs prior to backup L5 510 that is identified at 454. That the backups F/I1 502 and L5 510 are on the same branch can be determined using the times for the backups 502, 504, 506, 508, 510 and 512, as well as the incarnation IDs and reset log IDs. Previous full or incremental backup F/I1 501 shares the same incarnation ID and reset log ID as log backup L5 510. As part of traversing restore tree 500, backups L2 504, L3 506 and L4 508 are also identified.

The log files and transactions from previous full or incremental backup 502 to restoration point 509, and transactions indicated by these log files, are determined at 458. Thus, it is determined that all of the transactions 1-150, 151-250 and 251-300 from log files for log backups L2 504, L3 506 and L4 508 are required for the restoration. In addition, some of the transactions in log backup L5 510 are used. More specifically, transactions 301 through 326 are provided. However, transactions 327 through 450 that are part of log backup L5 510 are not provided for the point-in-time restoration. At 460, transactions 150 through 326 and information for full or incremental backup F/I 502 are provided for the point-in-time restoration. The point-in-time restoration is then completed at 462. As discussed above, this may be performed by cloning the files for backups F/I1 502 though L4 508 and a portion of the files for L5 510 to a temporary view, as well as applying transactions 1 through 326. The temporary view may be deleted when the restoration process is completed. Through the use of snaptrees and fully hydrated incremental or full backups, the restoration may be very efficiently and rapidly performed.

Backups L7 514 and L8 516 occur after the point-in-time restoration. Consequently, log backups L7 514 and L8 516 have a new incarnation ID I2 and a new reset log ID R2. As can be seen in FIG. 6, the transaction numbers are now reset to new numbers 327'-450' and 451'-500'. However, full or incremental backup F/I1 502 may be indicated as a parent of log backups L7 514 and L8 516. This parent-child relationship is present because log backups L7 514 and L8 516 can be traced back to full or incremental backup F/I1 502 along restore tree 500. For similar reasons, log backups L2 504, L3 506 and L4 508 may be considered parents of log backups L7 514 and L8 516. However, log backups L5 510 and L6 512 are not parents of log backups L7 514 and L8 516. Thus, using the incarnation and restoration IDs, the relationships between nodes 502, 504, 506, 508, 510, 512, 514 and 516 and restoration points 509 can be managed.

Using method 450 a point-in-time restoration can be completed. Method 450 avoids requiring a user to select the dataset to be used in performing the restoration. Consequently, method 450 may be faster and less subject to error. In addition, only data required to bring database 102 to the restoration point are identified and provided for use in the restore. Consequently, fewer files may be provided in a shorter amount of time. Performing a point-in-time restoration may thus be more efficient.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving an identification of a restoration point of a database;
   analyzing, using a processor, metadata of a plurality of backups to identify from the plurality of backups a reduced dataset required to restore the database to the restoration point; and
   providing the reduced dataset for use in restoring the database to the restoration point;
   wherein the analyzing further comprises:
      detecting a backup having a time range including the restoration point;
      detecting a full or incremental backup closest to and before the restoration point,
      identifying a plurality of transactions occurring between the full or incremental backup and the backup; and
   wherein the providing the reduced dataset further includes providing the plurality of transactions and at least one additional transaction from the backup; and
   wherein the detecting the backup further comprises:
      determining, using the processor, a first node of a restore tree, the restore tree including a plurality of nodes corresponding to a plurality of backups, the first node corresponding to the backup; and wherein the detecting the full or incremental backup includes traversing a portion of a restore tree from the first node to a second node corresponding to the full or incremental backup.

2. The method of claim 1, wherein the detecting the full or incremental backup further includes:
ensuring that the full or incremental backup and the backup share a branch of the restore tree.

3. The method of claim 1, wherein the backup is a log backup.

4. The method of claim 1, further comprising:
restoring the database using the full or incremental backup and the plurality of transactions.

5. The method of claim 1, wherein the full or incremental backup is selected from a full backup and a fully hydrated incremental backup.

6. The method of claim 1, further comprising building the restore tree.

7. The method of claim 1, further comprising completing restoration of the database using the full or incremental backup and the plurality of transactions.

8. The method of claim 7, wherein completing restoration of the database using the full or incremental backup and the plurality of transactions includes cloning files associated with the full or incremental backup and the plurality of transactions.

9. The method of claim 8, further comprising storing the cloned files as a temporary view.

10. The method of claim 9, further comprising deleting the temporary view upon completing the restoration of the database.

11. The method of claim 1, further comprising determining a log file from the full or incremental backup.

12. A method, comprising:
receiving an identification of a restoration point of a database;
analyzing, using a processor, metadata of a plurality of backups to identify from the plurality of backups a reduced dataset required to restore the database to the restoration point; and
providing the reduced dataset for use in restoring the database to the restoration point;
wherein the analyzing further comprises:
detecting a backup having a time range including the restoration point;
detecting a full or incremental backup closest to and before the restoration point; and
identifying a plurality of transactions occurring between the full or incremental backup and the backup;
wherein the providing further includes
providing the plurality of transactions and at least one additional transaction from the backup; and
wherein the restoration point has a database restoration time and a storage system restoration time and wherein the detecting the backup further includes:
identifying a database backup time range for each of the plurality of backups;
identifying a storage system backup time for each of the plurality of backups; and
selecting the backup as having the database backup time range including the database restoration time and the storage system backup time range including the storage system restoration time.

13. A system for restoring a database, comprising
a processor configured to:
receive an identification of a restoration point of the database;
analyze metadata of a plurality of backups to identify from the plurality of backups a reduced dataset required to restore the database to the restoration point; and
provide the reduced dataset for use in restoring the database to the restoration point; and
a memory coupled to the processor and configured to provide the processor with instructions;
wherein the to analyze the metadata, the processor is configured to:
detect a backup having a time range including the restoration point;
detect a full or incremental backup closest to and before the restoration point; and
identify a plurality of transactions occurring between the full or incremental backup and the backup;
wherein to provide the reduced dataset the processor is configured to provide the plurality of transactions and at least one additional transaction from the backup; and
wherein to detect the backup the processor is further configured to:
determine a first node of a restore tree, the restore tree including a plurality of nodes corresponding to a plurality of backups, the first node corresponding to the backup; and
wherein to detect the full or incremental backup the processor is configured to traverse a portion of a restore tree from the first node to a second node corresponding to the full or incremental backup.

14. The system of claim 13, wherein to detect the full or incremental backup the processor is further configured to ensure that the full or incremental backup and the backup share a branch of the restore tree.

15. The system of claim 13, wherein the backup is a log backup.

16. The system of claim 13, wherein the full or incremental backup is selected from a full backup and a fully hydrated incremental backup.

17. A system for restoring a database, comprising:
a processor configured to:
receive an identification of a restoration point of the database;
analyze metadata of a plurality of backups to identify from the plurality of backups a reduced dataset required to restore the database to the restoration point; and
provide the reduced dataset for use in restoring the database to the restoration point; and
a memory coupled to the processor and configured to provide the processor with instructions
wherein the to analyze the metadata, the processor is configured to:
detect a backup having a time range including the restoration point;
detect a full or incremental backup closest to and before the restoration point; and
identify a plurality of transactions occurring between the full or incremental backup and the backup;
wherein to provide the reduced dataset the processor is configured to
provide the plurality of transactions and at least one additional transaction from the backup; and wherein the restoration point has a database restoration time and a storage system restoration time and wherein to detect the backup the processor is further configured to:
identify a database backup time range for each of the plurality of backups;
identify a storage system backup time for each of the plurality of backups; and
select the backup as having the database backup time range including the database restoration time and the storage system backup time range including the storage system restoration time.

18. A computer program product for restoring a database, the computer program product being embodied in a tangible non-transitory computer readable storage medium and comprising computer instructions for:
receiving an identification of a restoration point of a database;
analyzing metadata of a plurality of backups to identify from the plurality of backups a reduced dataset required to restore the database to the restoration point; and
providing the reduced dataset for use in restoring the database to the restoration point;
wherein the instructions for analyzing further include instructions for:
detecting a backup having a time range including the restoration point;
detecting a full or incremental backup closest to and before the restoration point; and
identifying a plurality of transactions occurring between the full or incremental backup and the backup;
wherein the instructions for providing further includes instructions for
providing the plurality of transactions and at least one additional transaction from the backup; and
wherein the instructions for detecting the backup further comprise instructions for:
determining, using a processor, a first node of a restore tree, the restore tree including a plurality of nodes corresponding to a plurality of backups, the first node corresponding to the backup; and
wherein the instructions for detecting the full or incremental backup includes instructions for
traversing a portion of a restore tree from the first node to a second node corresponding to the full or incremental backup.

19. The computer program product of claim 18 wherein the instructions for detecting the full or incremental backup further include instructions for:
ensuring that the full or incremental backup and the backup share a branch of the restore tree.

20. The computer program product of claim 18, wherein the backup is a log backup.

21. The computer program product of claim 18, wherein the full or incremental backup is selected from a full backup and a fully hydrated incremental backup.

22. A computer program product for restoring a database, the computer program product being embodied in a tangible non-transitory computer readable storage medium and comprising computer instructions for:
receiving an identification of a restoration point of a database;
analyzing metadata of a plurality of backups to identify from the plurality of backups a reduced dataset required to restore the database to the restoration point; and
providing the reduced dataset for use in restoring the database to the restoration point;
wherein the instructions for analyzing further include instructions for:
detecting a backup having a time range including the restoration point;
detecting a full or incremental backup closest to and before the restoration point; and
identifying a plurality of transactions occurring between the full or incremental backup and the backup;
wherein the instructions for providing further includes instructions for
providing the plurality of transactions and at least one additional transaction from the backup; and
wherein the restoration point has a database restoration time and a storage system restoration time and wherein the instructions for detecting the backup further include instructions for:
identifying a database backup time range for each of the plurality of backups;
identifying a storage system backup time for each of the plurality of backups; and
selecting the backup as having the database backup time range including the database restoration time and the storage system backup time range including the storage system restoration time.

* * * * *

UNITED STATES PATENT AND TRADEMARK OFFICE
CERTIFICATE OF CORRECTION

PATENT NO. : 10,628,270 B1
APPLICATION NO. : 16/252491
DATED : April 21, 2020
INVENTOR(S) : Rupesh Bajaj et al.

It is certified that error appears in the above-identified patent and that said Letters Patent is hereby corrected as shown below:

In Column 23, Line(s) 4, after "time", delete "to" and insert --$t0$--, therefor.
In Column 23, Line(s) 14, after "from", delete "to" and insert --$t0$--, therefor.

Signed and Sealed this
Twenty-second Day of September, 2020

Andrei Iancu
*Director of the United States Patent and Trademark Office*